US010953904B1

(12) United States Patent
Sun

(10) Patent No.: US 10,953,904 B1
(45) Date of Patent: Mar. 23, 2021

(54) FOLDABLE BARROW

(71) Applicant: Benlong Sun, Zhejiang (CN)

(72) Inventor: Benlong Sun, Zhejiang (CN)

( * ) Notice: Subject to any disclaimer, the term of this patent is extended or adjusted under 35 U.S.C. 154(b) by 0 days.

(21) Appl. No.: 16/901,053

(22) Filed: Jun. 15, 2020

Related U.S. Application Data

(63) Continuation of application No. 16/748,602, filed on Jan. 21, 2020, now abandoned.

(30) Foreign Application Priority Data

Dec. 2, 2019 (CN) .......................... 201922115841.8

(51) Int. Cl.
*B62B 3/02* (2006.01)
*B62B 3/00* (2006.01)

(52) U.S. Cl.
CPC .............. *B62B 3/022* (2013.01); *B62B 3/002* (2013.01); *B62B 3/025* (2013.01); *B62B 2205/02* (2013.01); *B62B 2205/06* (2013.01)

(58) Field of Classification Search
CPC .. B62B 3/00; B62B 3/007; B62B 3/02; B62B 3/022; B62B 3/025
See application file for complete search history.

(56) References Cited

U.S. PATENT DOCUMENTS

| | | | |
|---|---|---|---|
| 9,145,154 B1* | 9/2015 | Horowitz | B62B 3/025 |
| 9,580,095 B2* | 2/2017 | Vargas, II | B62B 3/007 |
| 9,738,298 B1* | 8/2017 | Yang | B62B 5/0003 |
| 10,207,729 B2* | 2/2019 | Sun | B62B 3/02 |
| 10,435,055 B1* | 10/2019 | Zhu | B62B 7/08 |
| 2018/0170418 A1* | 6/2018 | Choi | B62B 7/08 |
| 2018/0297622 A1* | 10/2018 | Chen | B62B 3/007 |
| 2018/0327011 A1* | 11/2018 | Horowitz | B62B 5/065 |

* cited by examiner

*Primary Examiner* — Brian L Swenson
(74) *Attorney, Agent, or Firm* — WPAT Law, P.C.; Anthony King

(57) ABSTRACT

A foldable barrow includes a frame assembly. The frame assembly comprises a tie rod assembly, two front wheel carrier assemblies, two rear wheel carrier assemblies, two side wall assemblies, a front wall assembly, a rear wall assembly, a bottom frame assembly, four upper fixing seats, two tie rod fixing seats, and two lower fixing seats. The foldable barrow is attractive in structure, can be folded easily and rapidly, has a small size after being folded, occupies a small space, and is more convenient to carry and transport compared with traditional non-foldable barrows.

13 Claims, 23 Drawing Sheets

FOLDABLE BARROW

BACKGROUND OF THE INVENTION

Technical Field

The invention belongs to the technical field of barrows, and particularly relates to a foldable barrow.

Description of Related Art

Barrows (wheelbarrows or hand trucks) are handling vehicles pushed or pulled by manpower. With the continuous development of material handling techniques and constant upgrading of various handling devices, the handling devices are becoming more advanced and intelligent, but the barrows are still indispensible handling tools.

At present, the structure of traditional barrows is designed in such a manner: an unloading platform such as a flat plate or a hopper is driven through a handle, four wheels are arranged at the bottom of the unloading platform, the handle, the unloading platform and the wheels are fixedly assembled through welding or through screws and nuts and cannot be folded, a tool is needed when the barrows are disassembled, the whole barrows occupy a large space when transported in a container or used, the assembly process is complex, and the barrows are inconvenient to carry and are not beneficial to production management of workshops or other places.

BRIEF SUMMARY OF THE INVENTION

The objective of the invention is to provide a foldable barrow to solve the problem that existing barrows are non-foldable and inconvenient to carry and transfer.

To fulfill the above objective of the invention, the following technical solution is adopted by the invention: the foldable barrow comprises a frame assembly, wherein the frame assembly comprises a tie rod assembly, two front wheel carrier assemblies, two rear wheel carrier assemblies, two side wall assemblies, a front wall assembly, a rear wall assembly, a bottom frame assembly, four upper fixing seats, two tie rod fixing seats, and two lower fixing seats;

Each side wall assembly comprises two side horizontal tubes and at least one first X-shaped link mechanism, wherein each of the upper ends of two sides of the first X-shaped link mechanism is hinged to one end of one side horizontal tube, the other end of each side horizontal tube is riveted to one upper fixing seat, and the lower ends of the two sides of the first X-shaped link mechanism are respectively riveted to one tie rod fixing seat and one lower fixing seat;

The front wall assembly comprises a second X-shaped link mechanism and two front horizontal tubes, wherein each of the upper ends of two sides of the second X-shaped link mechanism is hinged to one front horizontal tube; and the rear wall assembly is identical in structure with the front wall assembly;

The two side wall assemblies, the front wall assembly and the rear wall assembly are connected end to end to form a rectangular frame structure;

The bottom frame assembly is arranged at the bottom of the rectangular frame structure and comprises a third X-shaped link mechanism, and four ends of the third X-shaped link mechanism are respectively riveted to the two tie rod fixing seats 2 and the two lower fixing seats 7;

The tie rod assembly comprises a tie rod handle, a middle tie rod and two side tie rods, wherein the tie rod handle is mounted at the upper end of the middle tie rod, the upper ends of the two side tie rods are symmetrically arranged on two sides of the middle tie rod and are riveted to the middle tie rod, and the lower ends of two side tie rods are respectively riveted to the front ends of the two tie rod fixing seats;

Each front wheel carrier assembly comprises a vertical tube, a tire holder and a tire, wherein the vertical tube, the tire holder and the tire are sequentially mounted from top to bottom, and the vertical tube penetrates through a through hole in one tie rod fixing seat and a through hole in one upper fixing seat to be fixed. The rear wheel carrier assemblies are identical in structure with the front wheel carrier assemblies. A vertical tube of each rear wheel carrier assembly penetrates through a through hole in one lower fixing seat and a through hole in another upper fixing seat to be fixed.

The assemblies constituting multiple faces of the frame assembly of the invention and the tie rod assembly are foldable, so that the barrow has a small size after being folded, can be folded to the maximum extent, and occupies a smaller space.

Furthermore, the first X-shaped link mechanism comprises at least one X-shaped structure formed by crossed riveting of a long side tube and a short side tube; or, the second X-shaped link mechanism is formed by crossed riveting of two front tubes.

Furthermore, the third X-shaped link mechanism is foldable and comprises two short bottom frame tubes, two long bottom frame tubes and a bottom frame connecting seats, wherein a limiting board is arranged on the upper surface of the bottom frame connecting seat, and the two short bottom frame tubes and the two long bottom frame tubes are arranged below the limiting board in a crossed manner and are rotatably connected to the bottom frame connecting seat.

Furthermore, the bottom frame connecting seat comprises an upper connecting piece and a lower connecting piece, wherein the upper connecting piece is detachably connected to the lower connecting piece, and an upper surface of the upper connecting piece is the limiting board; and the two short bottom frame tubes are respectively riveted into grooves in two ends of the upper connecting piece, and the two long bottom frame tubes are respectively riveted to two ends of the lower connecting piece.

Furthermore, the bottom frame connecting seat further comprises two U-shaped parts, two protruding parts are respectively and symmetrically arranged at the two ends of the lower connecting piece, the end of each bottom frame tube penetrates through the middle of one U-shaped part and is fixed by welding, and the two ends of an open side of each U-shaped part are riveted to one protruding part.

Furthermore, the tie rod assembly further comprises a tie rod connecting seat, a middle tie rod limiting seat, a stepped ball head and a spring, wherein the lower end of the middle tie rod stretches into a vertical through hole in the tie rod connecting seat and is able to slide upwards and downwards, the two side tie rods are symmetrically arranged on two sides of the tie rod connecting seat and are riveted to the tie rod connecting seat, and the stepped ball head and the spring are arrange at the upper end of the interior of the middle tie rod limiting seat;

The upper end of the middle tie rod limiting seat stretches into the middle tie rod and is riveted to the lower end of the middle tie rod through a rivet, and the side wall of the lower end of the middle tie rod is formed with a hole allowing the stepped ball head to stretch or retreat; the upper end of the middle tie rod limiting seat is formed with a mounting through hole radially penetrating through the middle tie rod limiting seat, the stepped ball head has an end abutting against one end of the spring and an end penetrating through one side of the mounting through hole to stretch out of the hole, and the other end of the spring penetrates through the other side of the mounting through hole to abut against the inner wall of the middle tie rod;

A key protrusion capable of being pressed inwards is arranged on one side of the tie rod connecting seat, and a slope which gradually inclines towards the axis from bottom to top is arranged on the inner wall of the vertical through hole below the key protrusion;

The middle tie rod slides upwards in the vertical through hole to drive the middle tie rod limiting seat to move upwards, and the stepped ball head moves upwards along the slope to abut against the inner wall of the key protrusion.

Furthermore, the tie rod connecting seat comprises an upper connecting seat and a lower connecting seat, wherein the upper connecting seat and the lower connecting seat are connected through a rivet to form a fastener, and the middle tie rod penetrates through a vertical through hole in the center of the fastener and is able to slide upwards and downwards; and the key protrusion is formed at the upper end of the side face of the upper connecting seat, and the slope is arranged on the inner wall of the vertical through hole in the lower end of the upper connecting seat.

Furthermore, the tie rod assembly further comprises two side tie rod mounting blocks, wherein each of the two side tie rod mounting blocks is riveted to the lower end of one side tie rod and is riveted to the front end of one tie rod fixing seat; or, a flange is arranged on the lower surface of the middle tie rod limiting seat.

Furthermore, each front wheel carrier assembly or each rear wheel carrier assembly comprises a lock, a lock spring and a shaft sleeve, wherein the vertical tube, the shaft sleeve and the tire holder are sequentially arranged from top to bottom in a sleeving manner, and the lock and the lock spring are arranged in the shaft sleeve; and the wall of the lower end of the vertical tube is formed with a mounting through hole, and the upper end of the shaft sleeve is formed with a radial through hole;

The lock spring and a hook are respectively arranged on the upper portion and the lower portion of the rear end of the lock, a protruding part is arranged at the front end of the lock, a limiting clamp groove is formed in a cylinder at the upper end of the tire holder, the protruding part penetrates through one end of the through hole to stretch out of the mounting through hole, the lock spring stretches out of the other end of the through hole to abut against the inner wall of the vertical tube, and the hook is clamped in the limiting clamp groove.

Furthermore, a spring mounting hole is formed in the upper portion of the rear end of the lock, and the front end of the lock spring abuts against the bottom of the spring mounting hole;

Or, the limiting clamp groove is an annular groove;

Or, symmetrical sliding grooves are formed in two side faces of a lock body and are matched with sliding rails on two sides of the inner wall of the through hole.

Furthermore, the front wheel carrier assemblies or the rear wheel carrier assemblies of the invention are of another structure. Particularly, in addition to the vertical tube, the tire holder and the tire, each front wheel carrier assembly or each rear wheel carrier assembly further comprises a plastic shaft sleeve and a U-shaped elastic buckle, wherein the plastic shaft sleeve is sequentially provided with a through hole, a limiting protrusion and a trapezoidal protrusion from top to bottom, a circular shaft on the tire holder is sleeved with the plastic shaft sleeve, the limiting protrusion protrudes towards the circular shaft to be clamped in a groove in the upper portion of the circular shaft, the U-shaped elastic buckle comprises a U-shaped leaf spring and a cylindrical head arranged close to an opening of the U-shaped leaf spring and is inversely mounted in the plastic shaft sleeve, the cylindrical head is clamped in the through hole in the plastic shaft sleeve, a trapezoidal notch is formed in an outer circle of the bottom end of the vertical tube, the vertical tube is formed with a through hole located above the trapezoidal notch and is disposed around the U-shaped elastic buckle and the plastic shaft sleeve, the cylindrical head is clamped in the through hole in the vertical tube, and the trapezoidal notch in the vertical tube is clamped on the trapezoidal protrusion on the plastic shaft sleeve.

Furthermore, the plastic shaft sleeve is provided with two limiting protrusions which are arranged in the middle of the plastic shaft sleeve in a bilaterally symmetrical manner, and the limiting protrusions are separated on three sides and connected at the bottom, are perpendicular to the axis direction of the plastic shaft sleeve, and protrude towards the interior of the plastic shaft sleeve.

Compared with the prior art, the invention has the following beneficial effects: the barrow is attractive in structure, can be folded easily and rapidly, has a small size after being folded, occupies a small space, and more convenient to carry and transport compared with traditional non-foldable barrows.

DETAILED DESCRIPTION OF THE INVENTION

The technical solution of the invention is further described below with reference to specific embodiments so as to be clearer and more understandable. Those skilled in the art can easily appreciate other advantages and effects of the invention according to the contents disclosed in the specification. The invention can also be implemented or applied through other different specific embodiments, and various modifications or variations of the details in the specification can be made on the basis of different points of view and different applications without deviating from the spirit of the invention.

Embodiment 1

Figure 1:
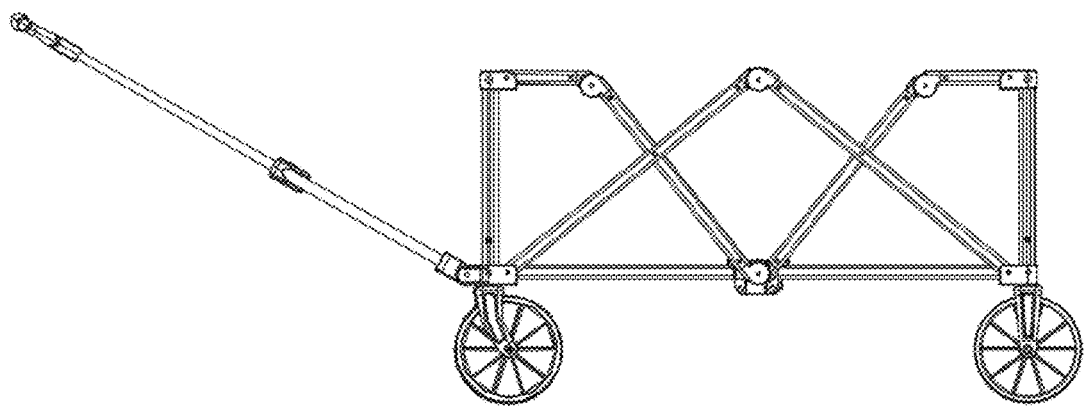
FIG. 1 is a front view of a foldable barrow.
Figure 2:
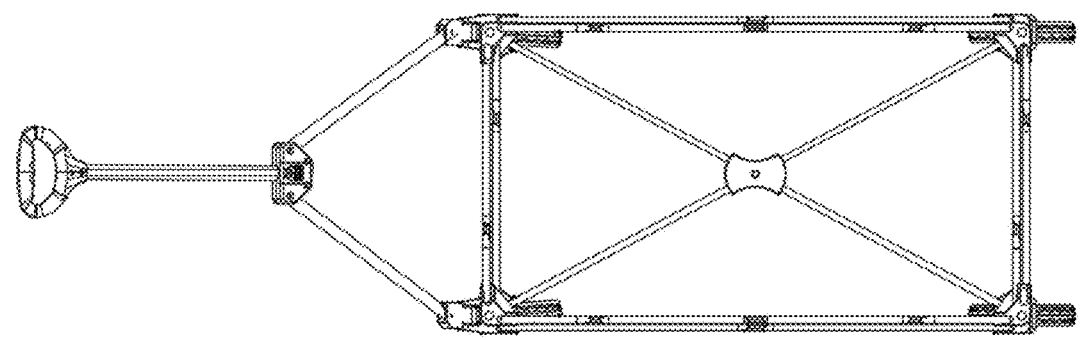
FIG. 2 is a top view of FIG. 1.
Figure 3:
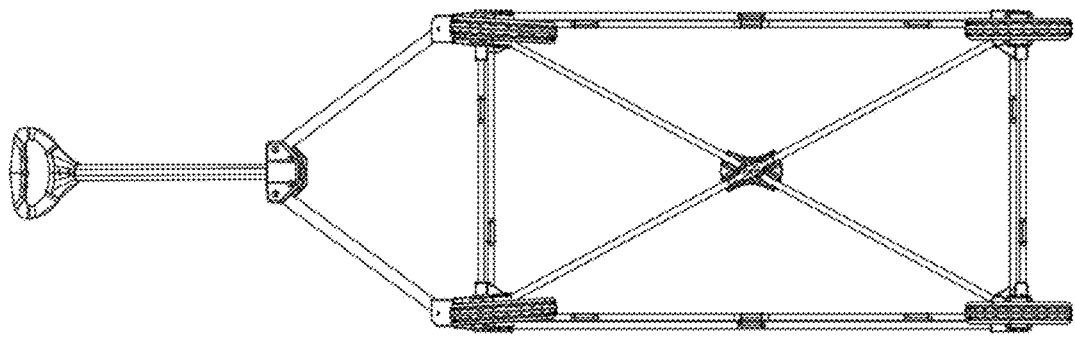
FIG. 3 is a bottom view of FIG. 1.
Figure 4:
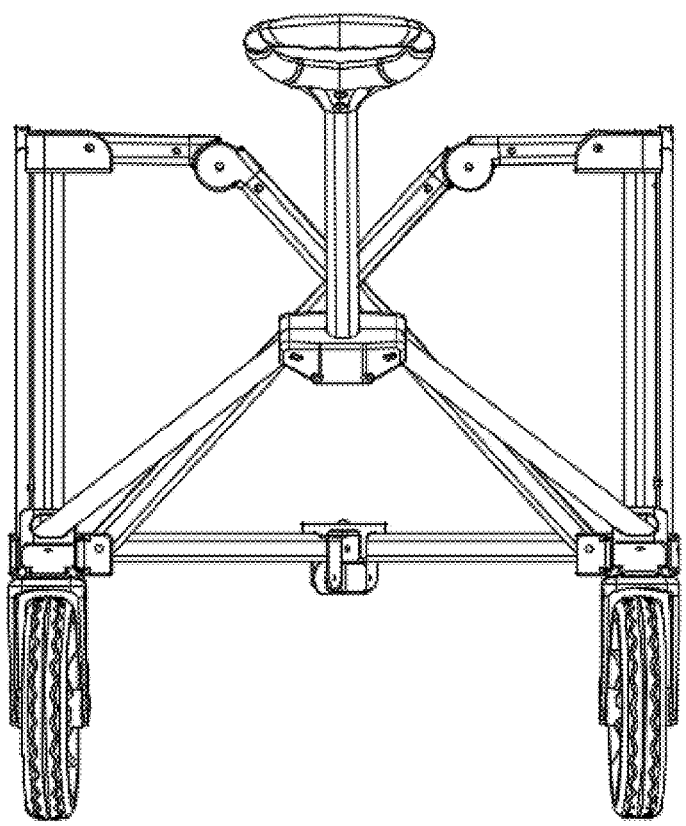
FIG. 4 is a left view of FIG. 1.
Figure 5:
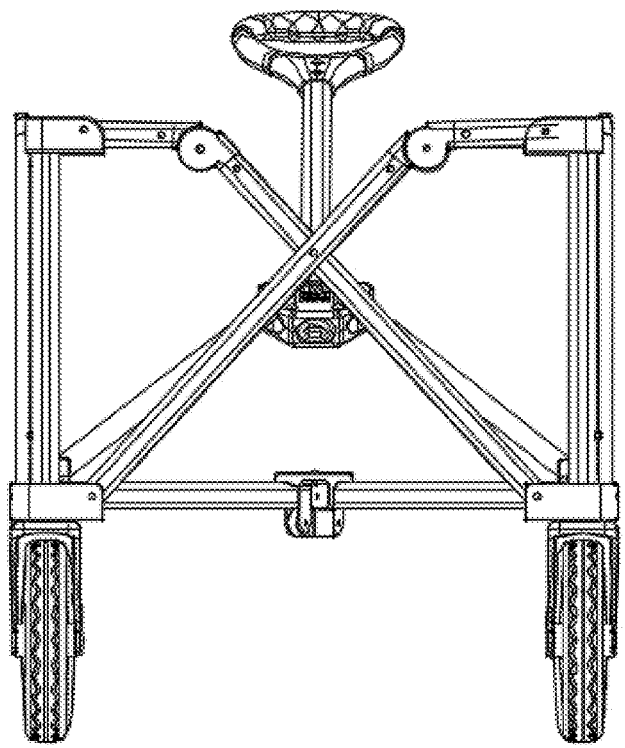
FIG. 5 is a right view of FIG. 1.
Figure 6:
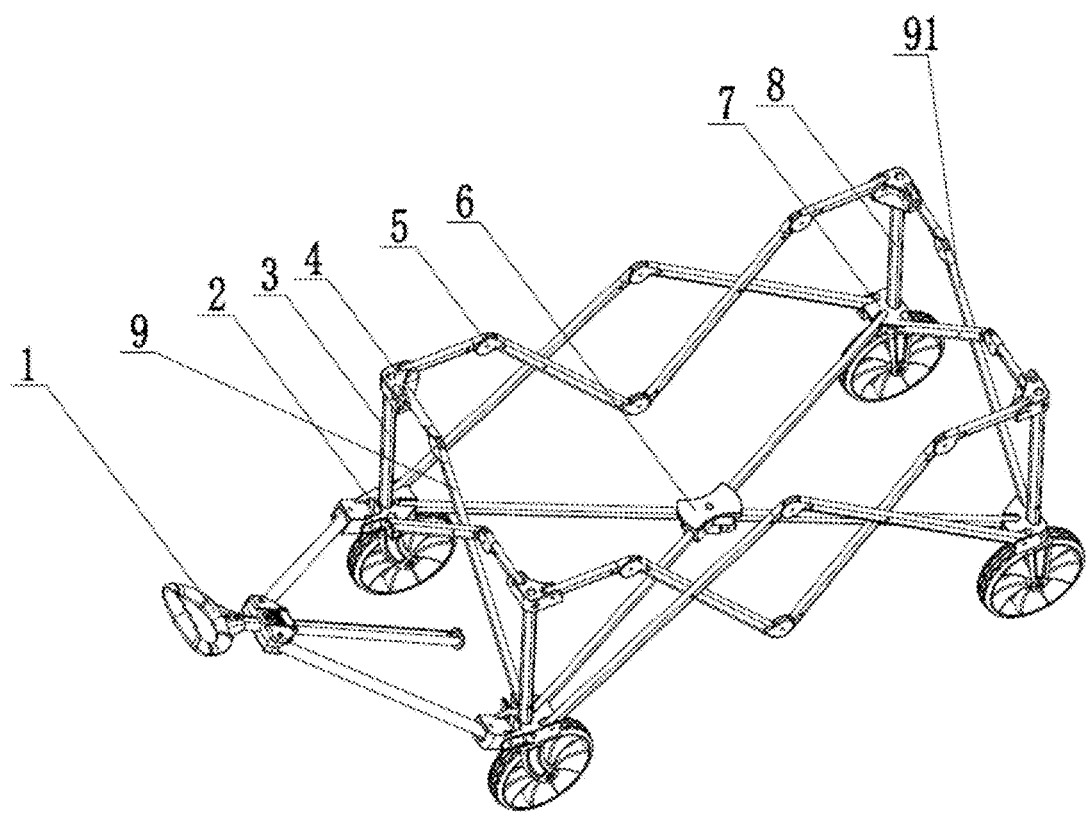
FIG. 6 is a schematic diagram of FIG. 1 in a fully unfolded state.
Figure 7:
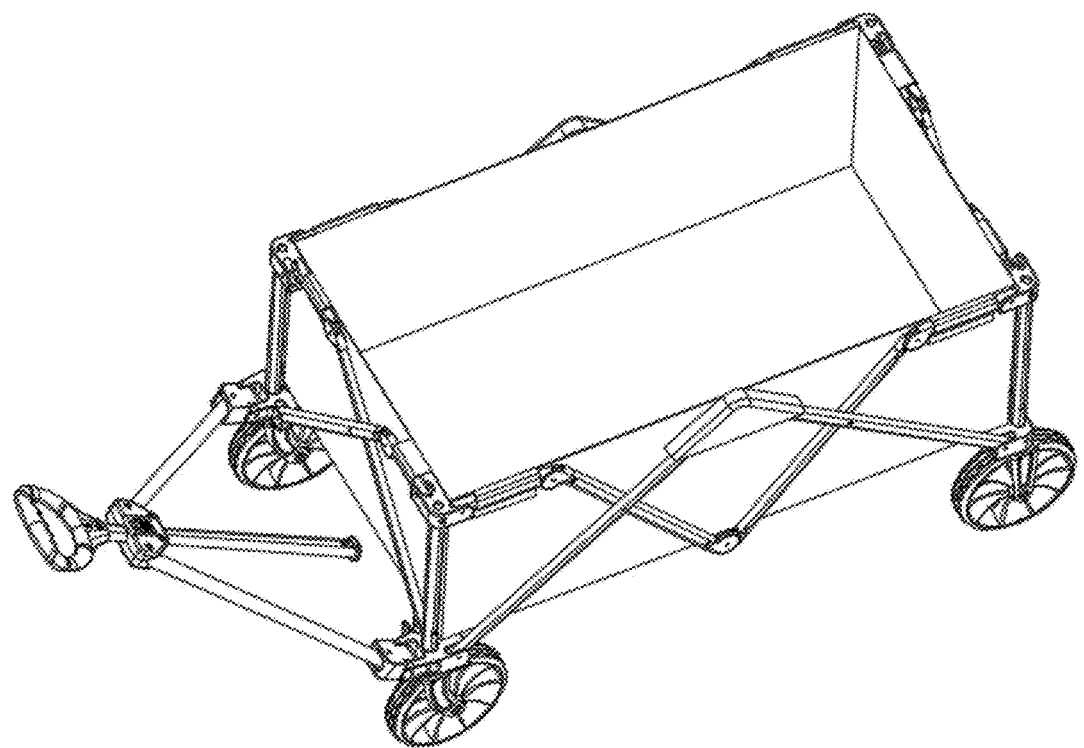
FIG. 7 is a schematic diagram of FIG. 6 in a state where a carriage is assembled.

As shown in FIG. 6, this embodiment discloses a foldable barrow comprising a frame assembly, wherein the frame assembly comprises a tie rod assembly 1, two front wheel carrier assemblies 3, two rear wheel carrier assemblies 8, two side wall assemblies 5, a front wall assembly 9, a rear wall assembly 91, a bottom frame assembly 6, four upper fixing seats 4, two tie rod fixing seats 2, and two lower fixing seats 7, and all the assemblies are connected through the four upper fixing seats 4, the two tie rod fixing seats 2 and the two lower fixing seats 7.

Each side wall assembly 5 comprises two side horizontal tubes 28 and at least one first X-shaped link mechanism, wherein each of the upper ends of two sides of the first X-shaped link mechanism is hinged to one end of one side horizontal tube 28, the other end of each side horizontal tube is riveted to one upper fixing seat, and the lower ends of the two sides of the first X-shaped link mechanism are respectively riveted to one tie rod fixing seat and one lower fixing seat.

The front wall assembly 9 comprises a second X-shaped link mechanism and two front horizontal tubes 32, wherein each of the upper ends of two sides of the second X-shaped link mechanism is hinged to one front horizontal tube 32. The rear wall assembly 10 is identical in structure with the front wall assembly 9.

One side wall assembly 5, the other side wall assembly 5, the front wall assembly 9 and the rear wall assembly 91 are connected end to end to form a rectangular frame structure, and a carriage used for storing goods to be conveyed is arranged in the frame structure; and the bottom frame assembly 6 is arranged at the bottom of the rectangular frame structure and comprises a third X-shaped link mechanism, and four ends of the third X-shaped link mechanism are respectively pivoted to the two tie rod fixing seats 2 and the two lower fixing seats 7.

Figure 16:
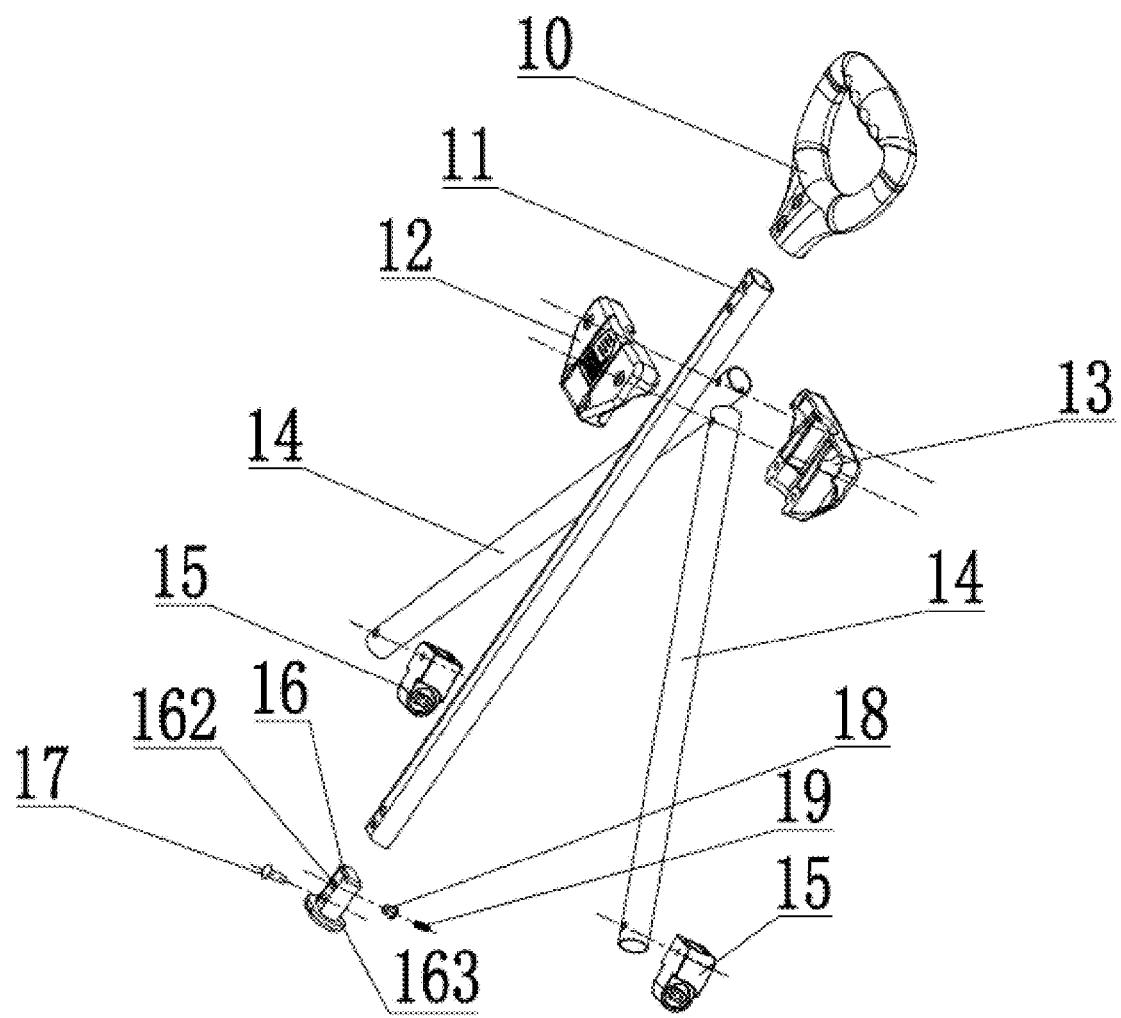
FIG. 16 is an exploded view of a tie rod assembly.

The tie rod assembly (shown in FIG. 16) comprises a tie rod handle 10, a middle tie rod 11 and two side tie rods 14, wherein the tie rod handle 10 is mounted at the upper end of the middle tie rod 11, the upper ends of the two side tie rods 14 are symmetrically arranged on two sides of the middle tie rod 11 and are riveted to the middle tie rod 11, and the lower ends of the two side tie rods 14 are respectively riveted to the front ends of the two tie rod fixing seats 2.

Figure 22:
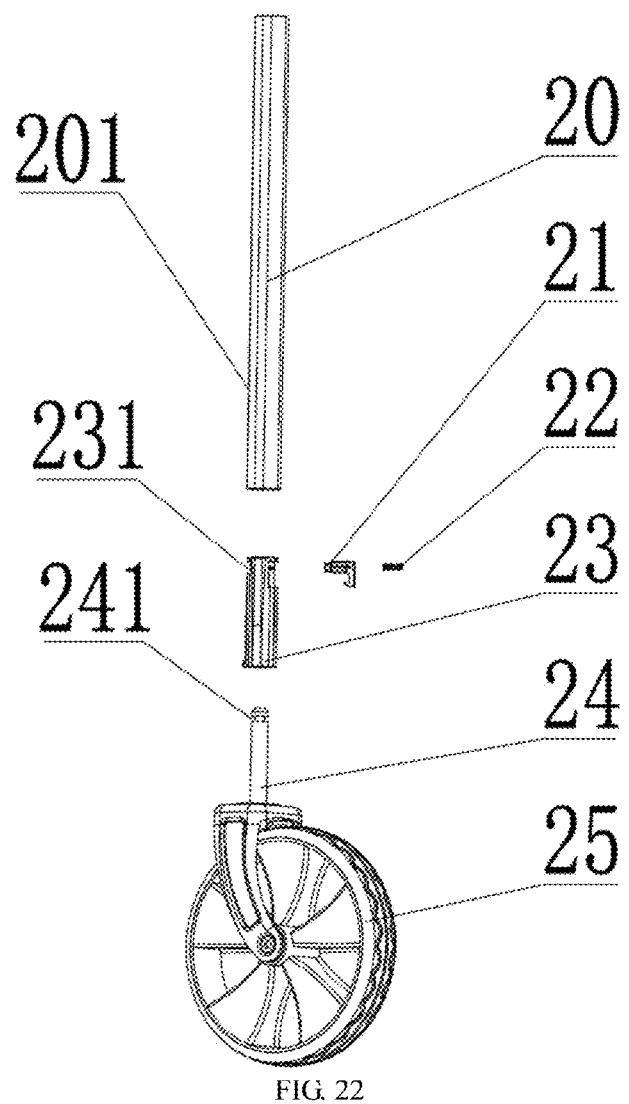
FIG. 22 is an exploded view of a front wheel carrier assembly or a rear wheel carrier assembly.

Each front wheel carrier assembly (shown in FIG. 22) comprises a vertical tube 20, a tire holder 24 and a tire 25, wherein the vertical tube 20, the tire holder 24 and the tire 20 are sequentially mounted from top to bottom, and the vertical tube 20 penetrates through a through hole in one tie rod fixing seat 2 and a through hole in one upper fixing seat 4 to be fixed. The rear wheel carrier assemblies are identical in structure with the front wheel carrier assemblies, and a vertical tube of each rear wheel carrier assembly penetrates through a through hole in one lower fixing seat 7 and a through hole in another upper fixing seat 4 to be fixed.

In this embodiment, the first X-shaped link mechanism of each side wall assembly 5 (shown in FIG. 28) comprises at least one X-shaped structure formed by crossed riveting of a long side tube 31 and a short side tube 30. Particularly, each side wall assembly 5 comprises two side horizontal tubes 28, four hinge parts 29, two short side tubes 30 and two long side tubes 31, wherein one long side tube 31 and one short side tube 30 are riveted to form one X-shaped link mechanism, and one end of each short side tube 30 is connected to one side horizontal tube 28 through one hinge part 29; and the long side tubes 31 of the X-shaped link mechanisms are connected through one hinge part 29, and the short side tubes 30 of the two X-shaped link mechanisms are connected through another hinge part 29.

In this embodiment, the second X-shaped link mechanism of the front wall assembly 9 or the rear wall assembly 10 (shown in FIG. 30) is formed by crossed riveting of two front tubes 33. Particularly, the front wall assembly 9 or the rear wall assembly 10 comprises two front horizontal tubes 32, two hinge parts 29 and two front tubes 33, wherein the two front tubes 33 are riveted in a crossed manner to from the X-shaped link mechanism, and each of the upper ends of the two front tubes 33 is connected to one front horizontal tube 32 through one hinge part 29.

Figure 9:
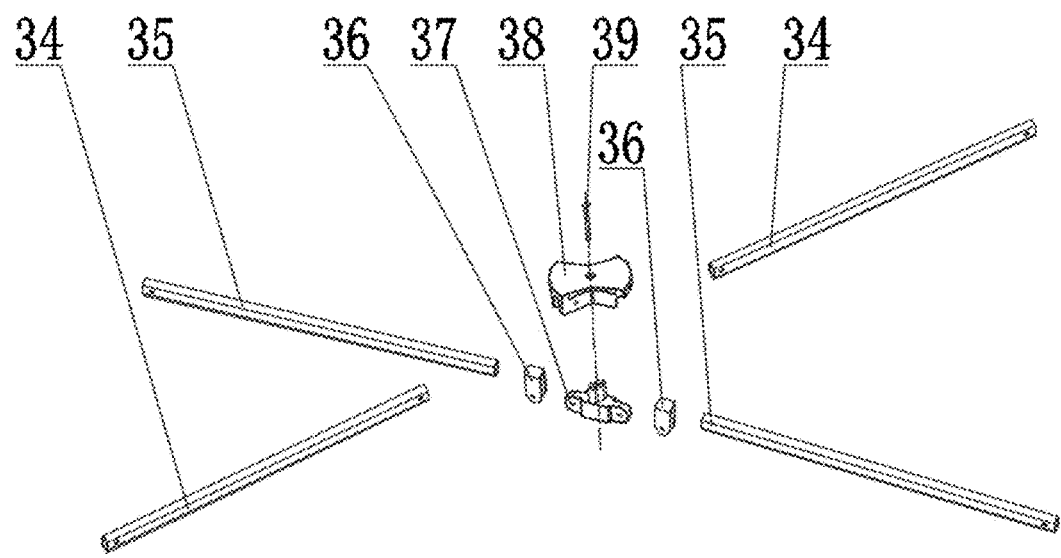
FIG. 9 is an exploded view of a bottom frame assembly.

In a preferred implementation, the third X-shaped link mechanism of the bottom frame assembly 6 (shown in FIG. 9) is foldable and comprises two short bottom frame tubes 34, two long bottom frame tubes 35 and a bottom frame connecting seat, wherein a limiting board is arranged on the upper surface of the bottom frame connecting seat, and the two short bottom frame tubes 34 and the two long bottom frame tubes 35 are arranged below the limiting board in a crossed manner and are rotatably connected to the bottom frame connecting seat. The short bottom frame tubes 34 or the long bottom frame tubes 35 are preferably square tubes.

Figure 12:
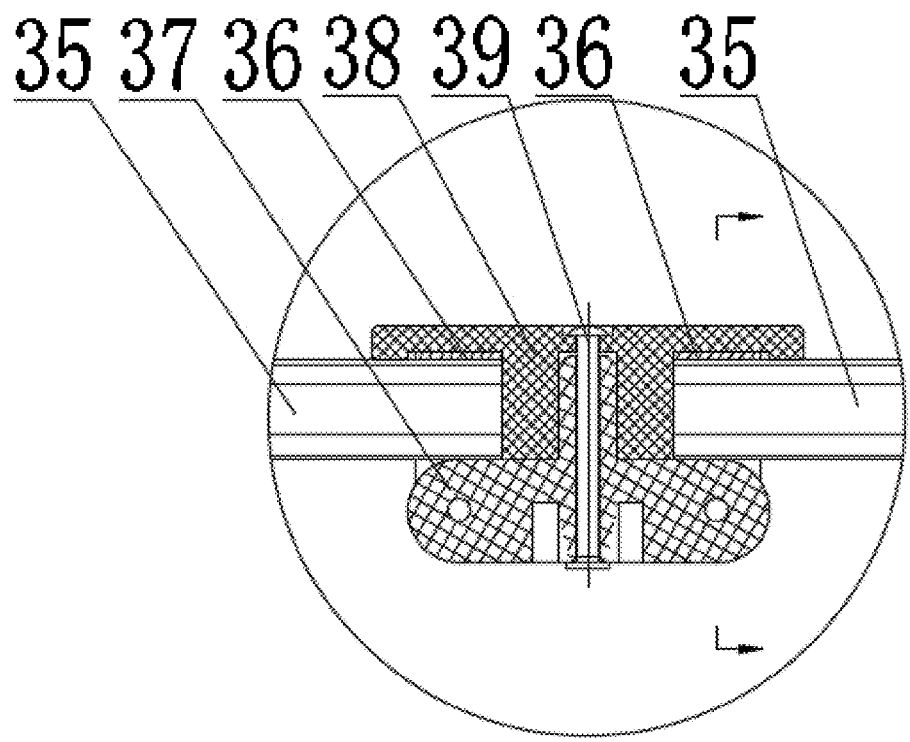
FIG. 12 is a schematic diagram of a long bottom frame tube in an unfolded state from one point of view.

Preferably, the bottom frame connecting seat of the bottom frame assembly 6 comprises an upper connecting piece 38 and a lower connecting piece 37, wherein the upper connecting piece 38 is detachably connected to the lower connecting piece 37, and the upper surface of the upper connecting piece 38 is the limiting board 40; and the two short bottom frame tubes 34 are respectively riveted into grooves in two symmetrical ends of the upper connecting piece 38, and the two long bottom frame tubes 35 are respectively riveted to two symmetrical ends of the lower connecting piece 37. The upper connecting piece 38 is detachably connected to the lower connecting piece 37 particularly as follows: a protrusion is arranged on the upper portion of the lower connecting piece 37, a pit matched with the protrusion is formed between the two grooves in the lower portion of the upper connecting piece 38, and after the upper connecting piece 38 and the lower connecting piece 37 are assembled, the protrusion is inserted into the pit to prevent the upper connecting piece 38 and the lower connecting piece 37 from moving relatively. Or, the middle of the upper connecting piece 38 and the middle of the lower connecting piece 37 are fastened through a rivet 39, and under the limitation of the upper plane of the upper connecting piece 38, the four bottom frame tubes can rotate to be horizontal to the maximum extent (as shown in FIG. 12).

Figure 13:
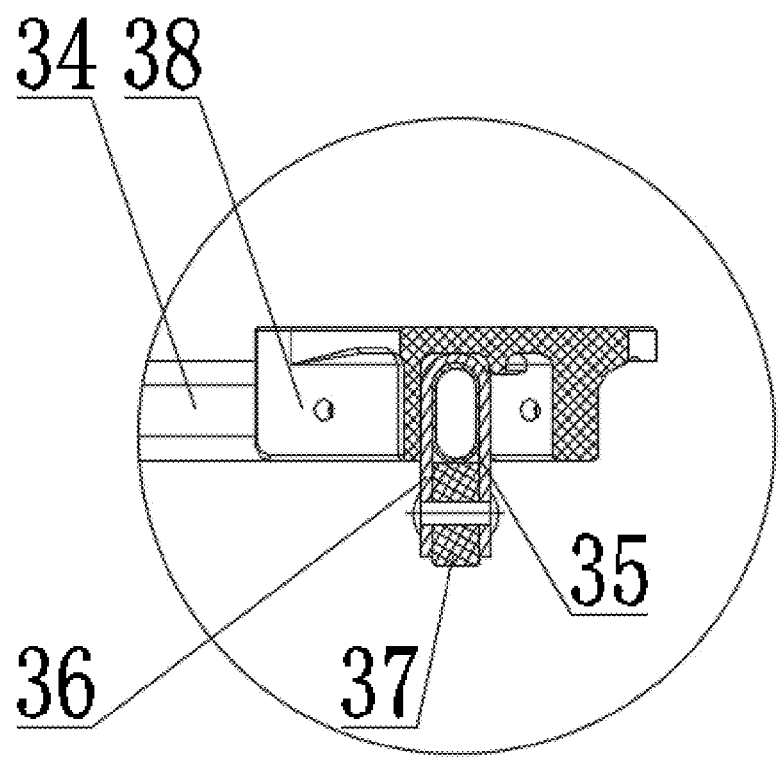
FIG. 13 is a schematic diagram of a short bottom frame tube in an unfolded state from one point of view.
Figure 14:
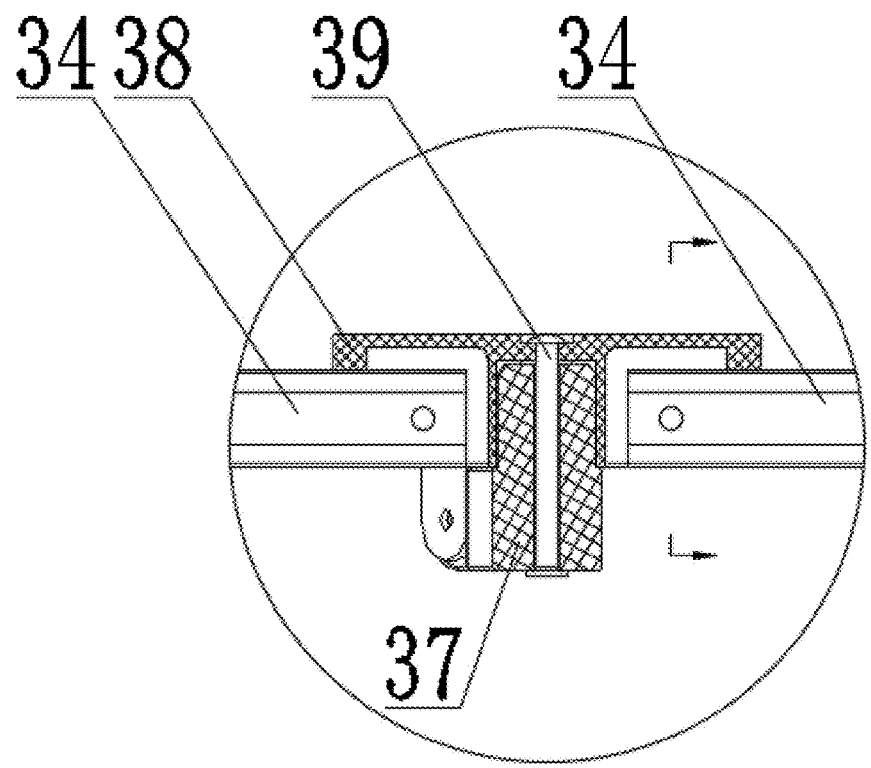
FIG. 14 is a schematic diagram of the short bottom frame tube in the unfolded state from another point of view.
Figure 15:
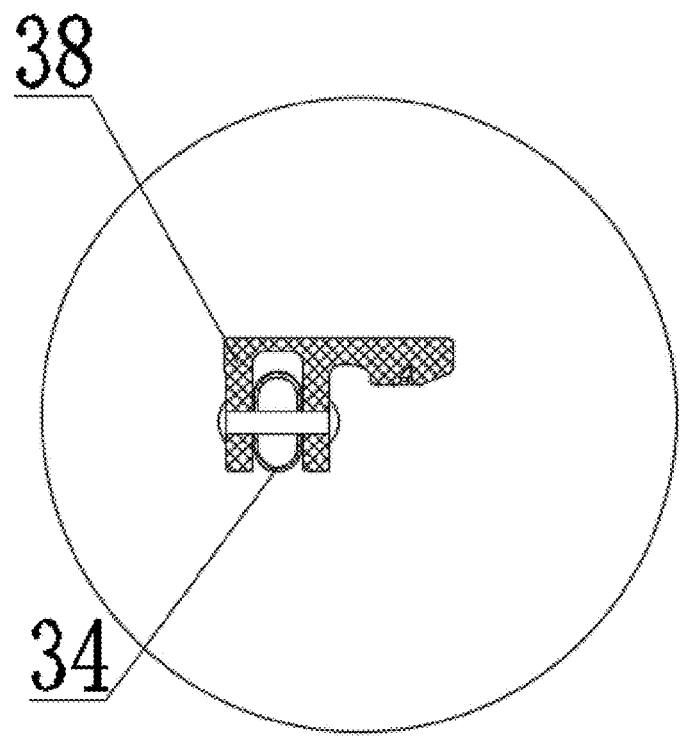
FIG. 15 is a schematic diagram of the long bottom frame tube in the unfolded state from another point of view.

In one design, the bottom frame assembly 6 further comprises two U-shaped parts 36, two protruding parts are respectively and symmetrically arranged at the two ends of the lower connecting piece 37, the end of each the long bottom frame tube 35 penetrates through the middle of one U-shaped part 36 and is fixed by welding, and each of the two ends of an open side of each U-shaped part 36 is hinged to one protruding part. The U-shaped parts are preferably made from metal such as iron or steel (as shown in FIG. 13).

Figure 10:
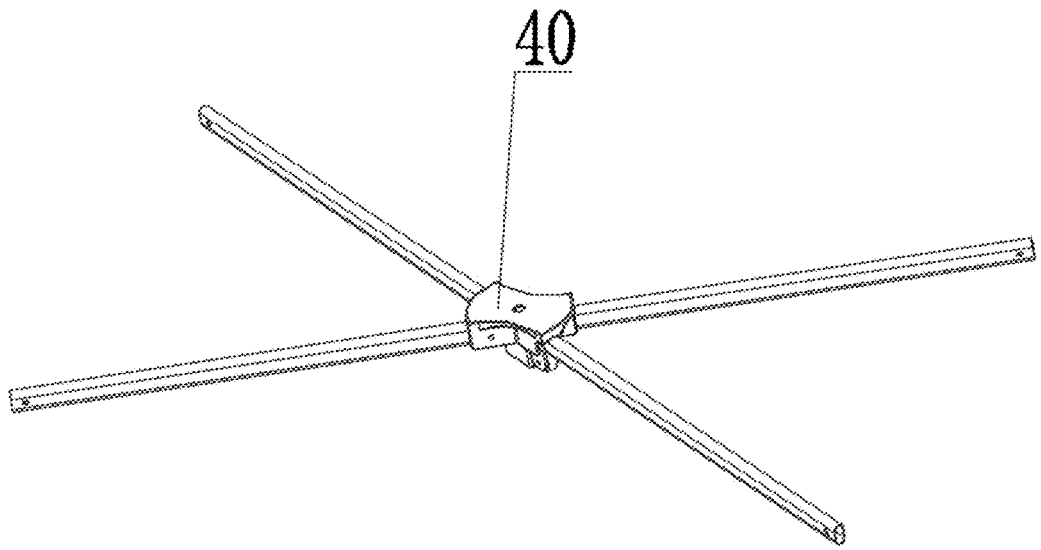
FIG. 10 is a schematic diagram of the bottom frame assembly in an unfolded state.
Figure 11:
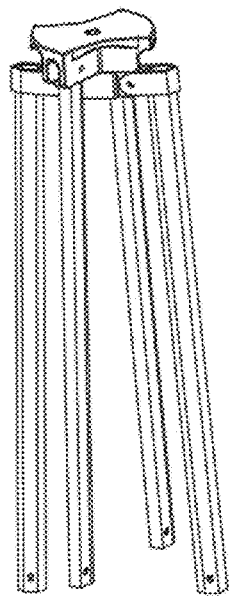
FIG. 11 is a schematic diagram of the bottom frame assembly in a folded state.

The folding process of the bottom frame assembly 6 is as follows:

When the bottom frame assembly 6 is to be folded, the upper connecting piece 38 is pulled upwards to drive the two short bottom frame tubes 34 to rotate around the axis of a rivet hinged to the upper connecting piece 38; and at the same time, the two long bottom frame tubes 35 and the U-shaped parts 36 are driven to rotate around the axis of a rivet hinged to the lower connecting piece 37. Because the two short bottom frame tubes 34 are clamped in the grooves of the upper connecting piece 38 and the two long bottom frame tubes 35 are welded into the U-shaped parts 36 which are riveted to the lower connecting piece 37, the four bottom frame tubes move in a plane defined by two fixed positions (as shown in FIG. 11);

When the bottom frame assembly 6 is to be unfolded, the upper connecting piece 38 is pressed downwards to enable the four bottom frame tubes to stretch in four directions until the four bottom frame tubes abut against the limiting board 40 of the upper connecting piece 38 (as shown in FIG. 10).

In this embodiment, the tie rod assembly (shown in FIG. 16) further comprises a tie rod connecting seat, a middle tie rod limiting seat 16, a stepped ball head 18 and a tie rod spring 19, wherein the lower end of the middle tie rod 11 stretches into a vertical through hole 120 in the tie rod connecting seat and is able to slide upwards and downwards, the two side tie rods 14 are symmetrically arranged on two sides of the tie rod connecting seat and are riveted to the tie rod connecting seat, and the stepped ball head and the tie rod spring 19 are arranged at the upper end of the interior of the middle tie rod limiting seat; the upper end of the middle tie rod limiting seat 16 stretches into the middle tie rod 11 and is riveted to the lower end of the middle tie rod 11 through a rivet 17, and the side wall of the lower end of the middle tie rod 11 is formed with a hole 111 allowing the stepped ball head to stretch or retreat; the upper end of the middle tie rod limiting seat 16 is formed with a mounting through hole radially penetrating through the middle tie rod liming seat 16, the stepped ball head 18 has an end abutting against one end of the spring 19 and an end penetrating through one side of the mounting through hole 162 to stretch out of a hole 111, and the other end of the spring 19 penetrates through the other side of the mounting through hole 162 to abut against the inner wall of the middle tie rod 11; a key protrusion 121 capable of being pressed inwards is arranged on one side of the tie rod connecting seat, and a slope 122 which gradually inclines towards the axis from bottom to top is arranged on the inner wall of the vertical through hole 120 below the key protrusion 121; and the middle tie rod 11 slides upwards in the vertical through hole 120 to drive the middle tie rod limiting seat 16 to move upwards, and the stepped ball head moves upwards along the slope to abut against the inner wall of the key protrusion 121.

Preferably, the tie rod connecting seat of the tie rod assembly comprises an upper connecting seat 12 and a lower connecting seat 13, wherein the upper connecting seat 12 and the lower connecting seat 13 are connected through a rivet to form a fastener, and the middle tie rod 11 penetrates through a vertical through hole 120 in the center of the fastener and is able to slide upwards and downwards; and the key protrusion 121 is formed at the upper end of the side face of the upper connecting seat 12, and the slope 122 is arranged on the inner wall of the vertical through hole 120 at the lower end of the upper connecting seat 12.

In this embodiment, the tie rod assembly further comprises two side tie rod mounting blocks 15, each of the two side tie rod mounting blocks 15 is riveted to the lower end of one side tie rod 14, and the side tie rod mounting blocks 15 are riveted to the front ends of the tie rod fixing seats 2. A flange 163 is arranged on the lower surface of the middle tie rod limiting seat 16.

Figure 19:
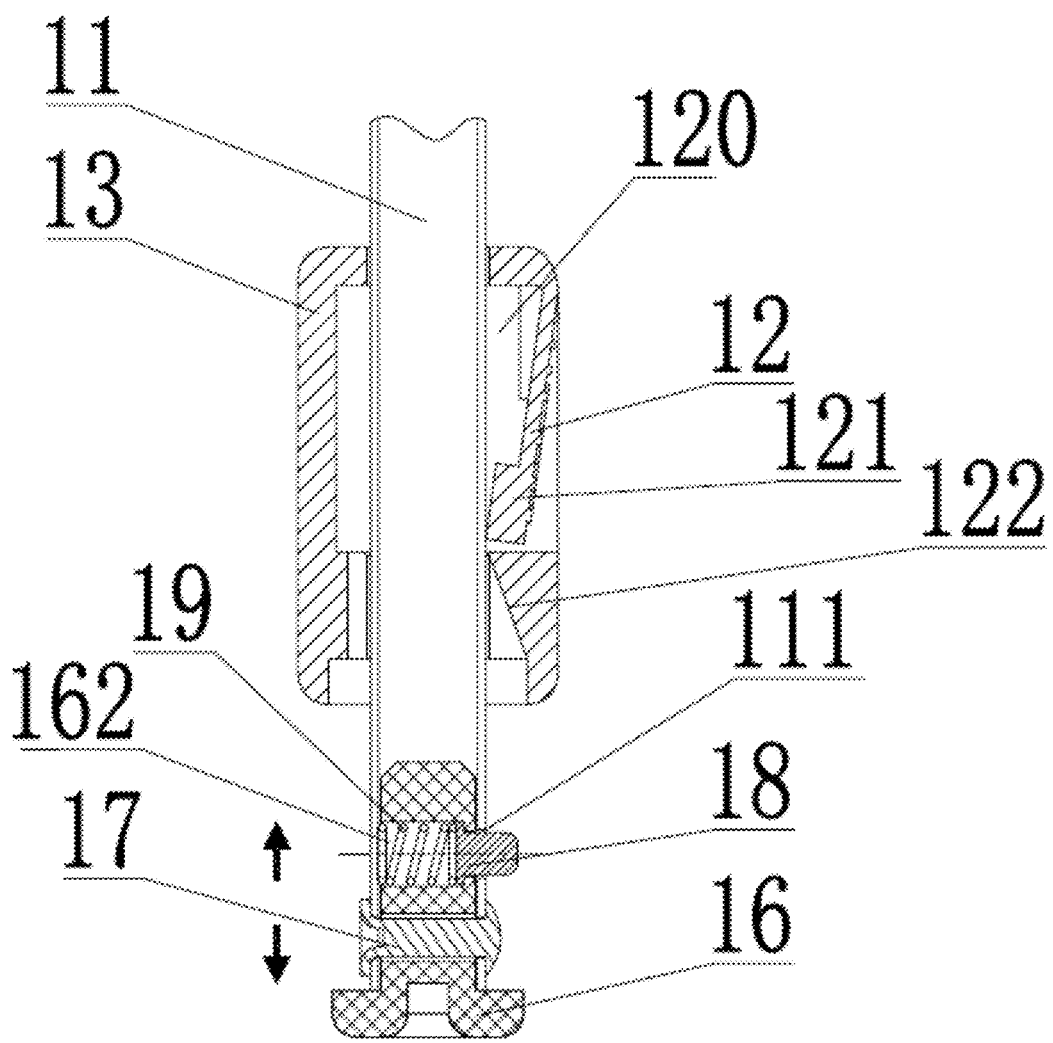
FIG. 19 is a schematic diagram of a tie rod in a non-locked state.
Figure 20:
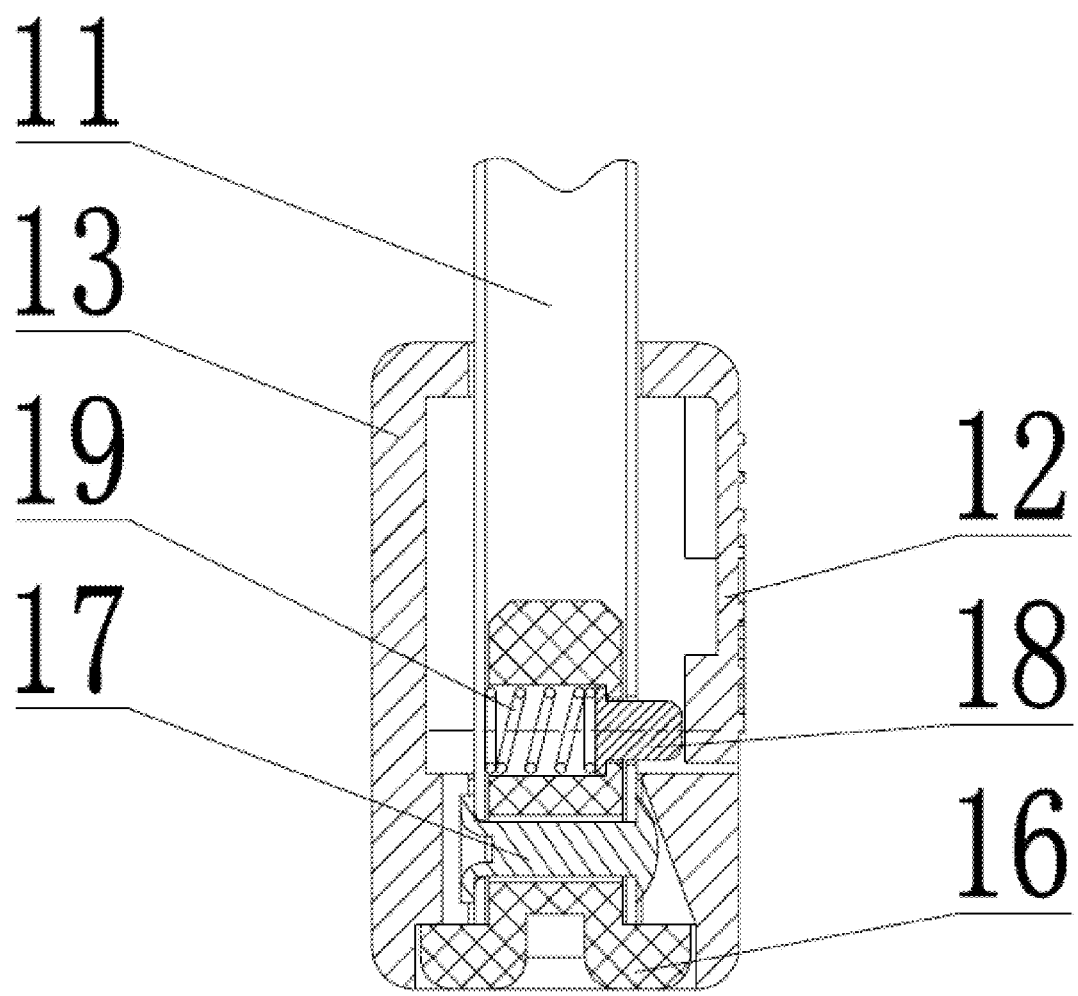
FIG. 20 is a schematic diagram of the tie rod in a locked state.
Figure 21:
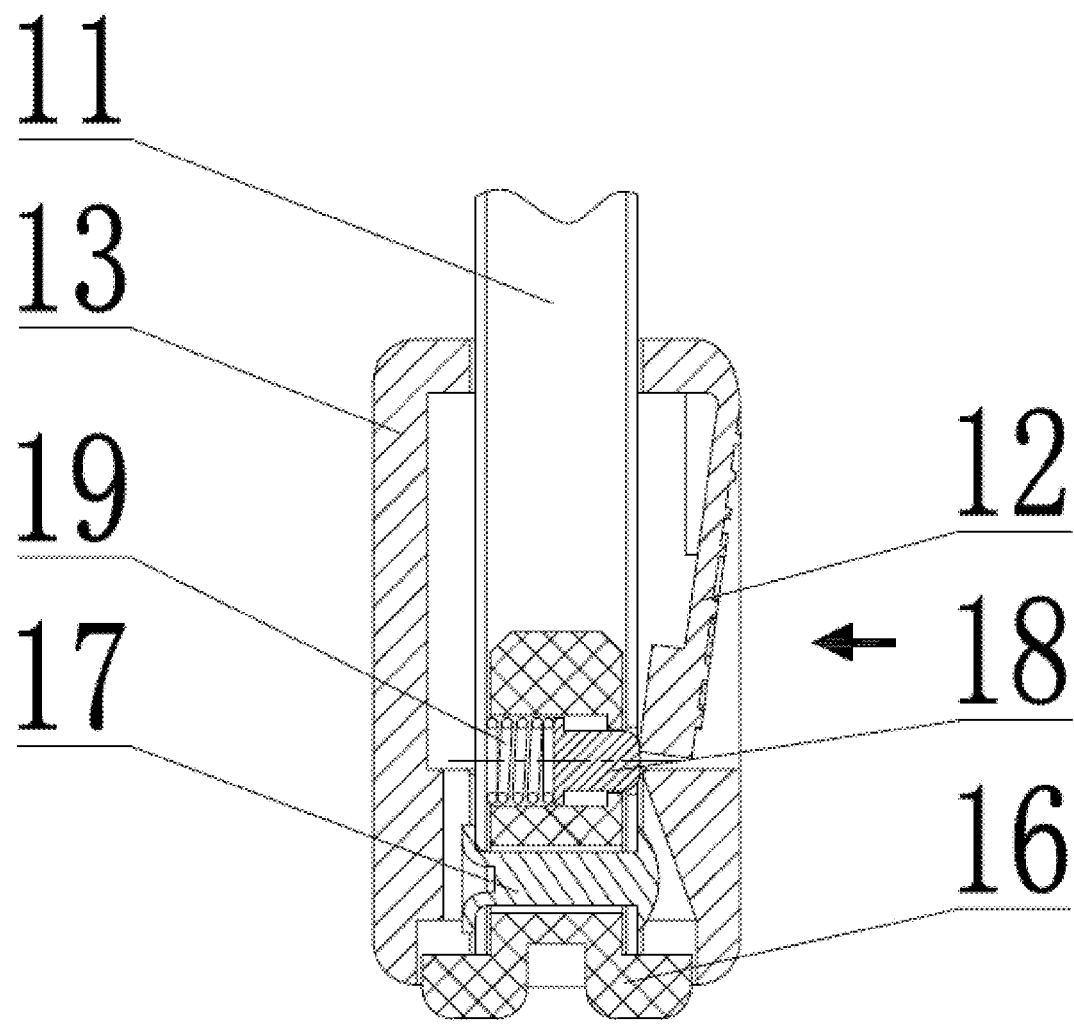
FIG. 21 is a schematic diagram of the tie rod in an unlocked state.

The folding and assembling principle of the foldable tie rod mechanism in this embodiment is as follows:

When the tie rod assembly is to be unfolded, the tie rod handle 10 is pulled upwards to drive the middle tie rod 11, the middle tie rod limiting seat 16, the stepped ball head 18 on the middle tie rod limiting seat 16, and the spring 19 to move upwards synchronously (as shown in FIG. 19). When the stepped ball head 18 touches the slope in the upper connecting seat 12, the stepped ball head 18 gradually compresses the spring 19 with the constant decrease of the space of the slope so as to retreat into the middle tie rod 11, then penetrates through the slope, and is ejected out of the hole of the middle tie rod 11 under the effect of the spring 19 to abut against the key protrusion in the upper connecting seat 12. At this moment, the lower end (namely the flange) of the middle tie rod limiting seat 16 exactly abuts against the lower plane of the fastener formed by the upper connecting seat 12 and the lower connecting seat 13, so that the middle tie rod 11 can no longer be pulled upwards (as shown in FIG. 20);

When the tie rod assembly is to be folded, the key protrusion in the upper connecting seat 12 is pressed first to press the stepped ball head 18 into the middle tie rod, so that the phenomenon that the stepped ball head 18 sustains the upper vertical face of the slope of the upper connecting seat 12, and consequentially, folding cannot be realized is avoided (as shown in FIG. 21). Then, the tie rod handle 10 is pressed downwards to push the middle tie rod 11, the middle tie rod limiting seat 16, the stepped ball head 18 on the middle tie rod limiting seat 16, and the spring 19 to move downwards synchronously (as shown in FIG. 19) until the tie rod handle 10 touches the upper plane of the fastener formed by the upper connecting seat 12 and the lower connecting seat 13.

In a preferred implementation, each front wheel carrier assembly 3 or each rear wheel carrier assembly 8 in this embodiment further comprises a lock 21, a lock spring 22 and a shaft sleeve 23, wherein the vertical tube 20, the shaft sleeve 23 and the tire holder 24 are sequentially arranged from top to bottom in a sleeving manner, and the lock 21 and the lock spring 22 are arranged in the shaft sleeve 23; the wall of the lower end of the vertical tube 20 is formed with a mounting through hole 201, and the upper end of the shaft sleeve 23 is formed with a radial through hole 231; and the lock spring 22 and a hook 211 are respectively arranged on the upper portion and the lower portion of the rear end of the lock 21, a protruding part 213 is arranged at the front end of the lock 21, a limiting clamp groove 241 is formed in a cylinder at the upper end of the tire holder 24, the protruding part 213 penetrates through one end of the through hole 231 to stretch out of the mounting through hole 201, the lock spring 22 stretches out of the other end of the through hole 231 to abut against the inner wall of the vertical tube 21, and the hook is clamped in the limiting clamp groove.

Preferably, a spring mounting hole 212 is formed in the upper portion of the rear end of the lock 21, and the front end of the lock spring stretches into the spring mounting hole and abuts against the bottom of the spring mounting hole. The limiting clamp groove 241 is an annular groove. In order to rapidly and reliably assemble the lock 21 into the through hole 231 in the shaft sleeve 23, symmetrical sliding grooves 215 are formed in two side faces of a lock body 214 and are matched with sliding rails 232 on two sides of the inner wall of the through hole 231. Preferably, the sliding grooves 215 are V-shaped grooves, and correspondingly, the sliding rails 232 are protruding V-shaped rails.

Figure 23:
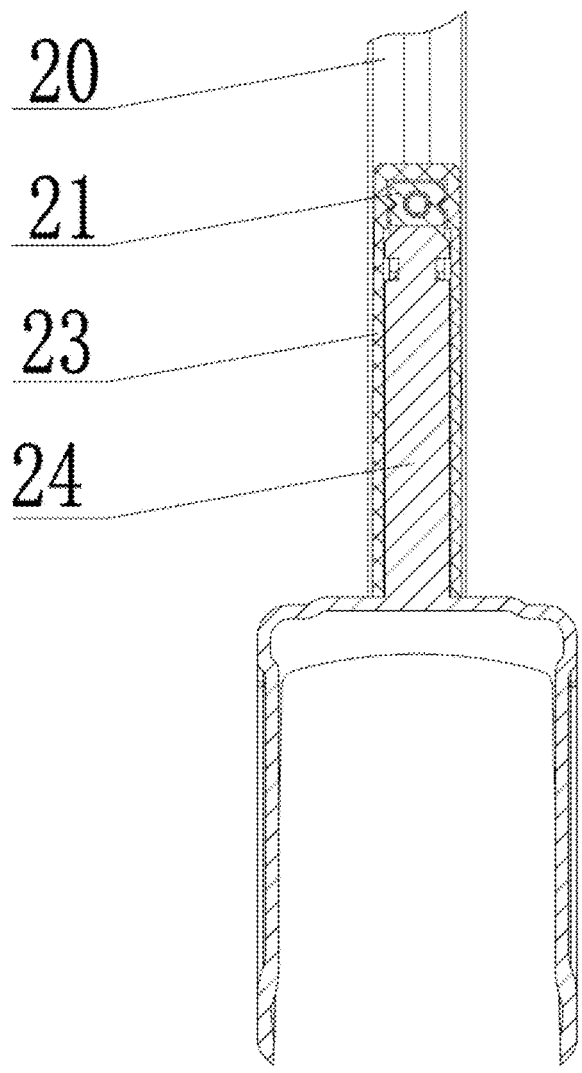
FIG. 23 is a front view of the front wheel carrier assembly or the rear wheel carrier assembly in a locked state.
Figure 24:
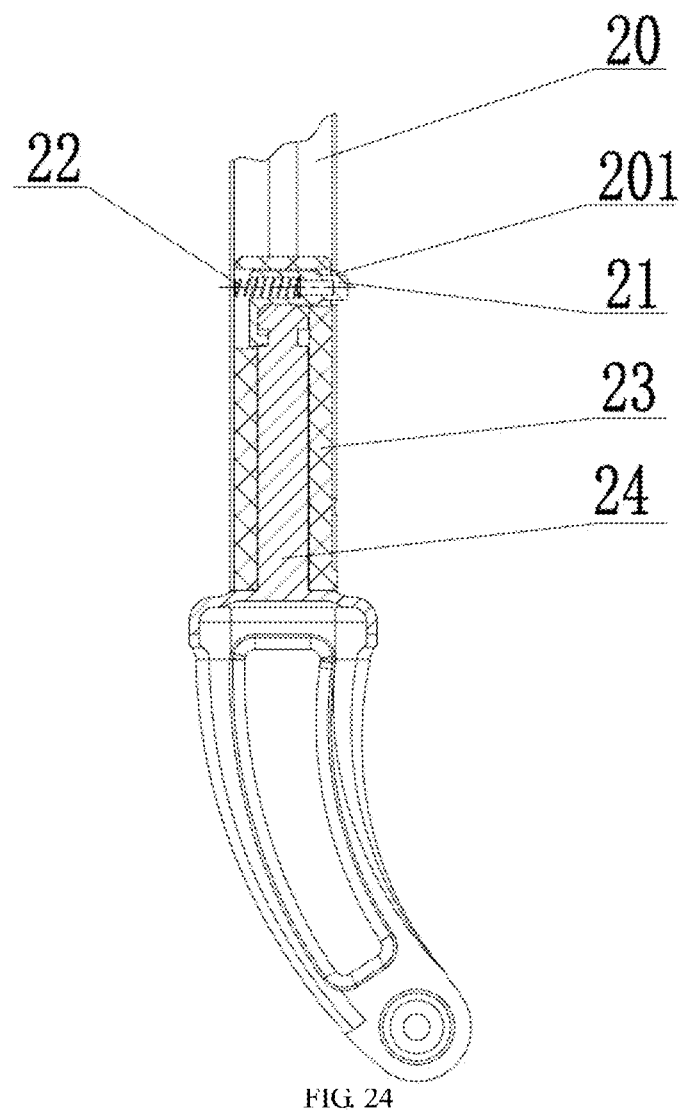
FIG. 24 is a side view of FIG. 23.
Figure 25:
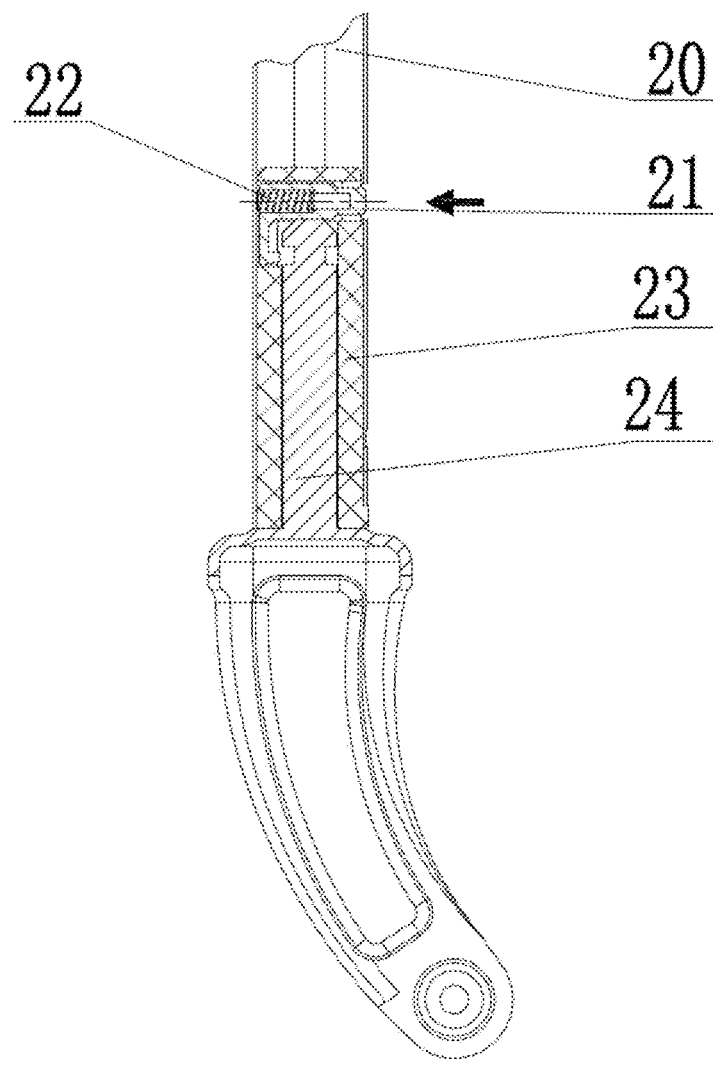
FIG. 25 is a schematic diagram of FIG. 23 in an unlocked state.
Figure 26:
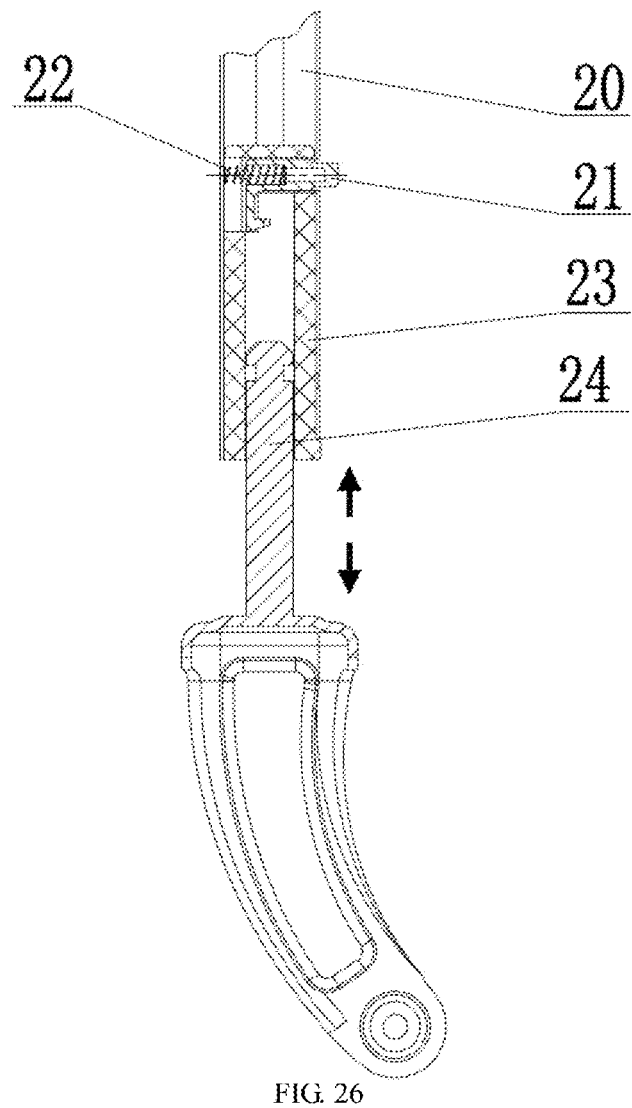
FIG. 26 is a schematic diagram of the front wheel carrier assembly or the rear wheel carrier assembly in an inserted or extracted state.
Figure 27:
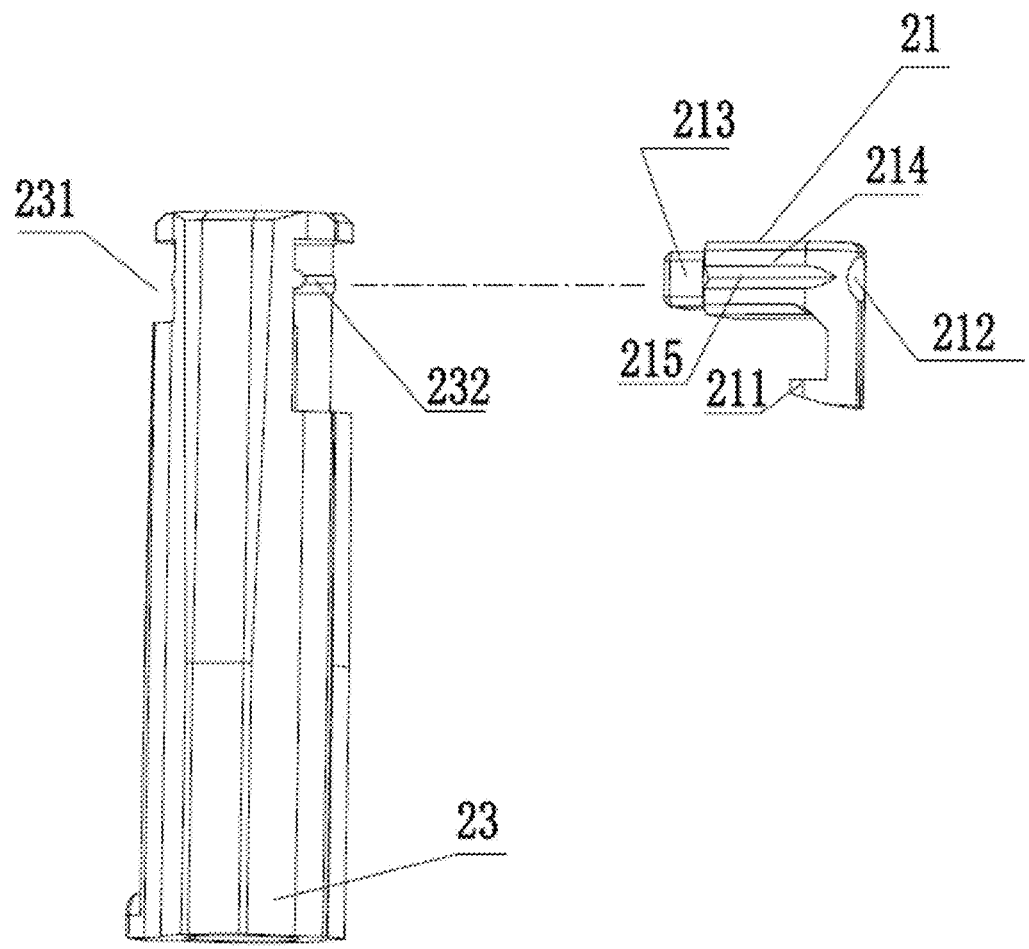
FIG. 27 is an assembly diagram of a shaft sleeve and a lock.

The assembly principle for realizing quick disassembly through the tire quick-disassembly structure in this embodiment is as follows:

The shaft sleeve 23 having the lock 21 and the lock spring 22 assembled therein is inserted into the vertical tube 20 to make sure that the lock 21 is able to freely penetrate through the mounting through hole in the wall of the vertical tube 20 under the effect of the lock spring 22. The tire holder 24 is inserted into the shaft sleeve 23, and after a slope at the top end of a circular axle of the tire holder 24 makes contact with the slope of the lock 21, the lock 21 is pushed to compress the lock spring 22 to move towards the interior of the vertical tube 20 until the hook on the lock 20 is clamped in the limiting clamp groove in the top end of the circular axle of the tire holder 24 (as shown in FIG. 23 and FIG. 24). At this moment, the tire holder 24 can axially rotate and cannot axially move upwards or downwards;

When the tire holder 24 is to be disassembled, the lock 21 is pressed first to enable the hook on the lock to disengage from the limiting clamp groove in the top end of the tire holder 24 (as shown in FIG. 25), and then the tire holder 24 is pulled out (as shown in FIG. 26).

In a preferred implementation, each upper fixing seat 4 in this embodiment is formed with two right-angled grooves respectively corresponding to one side wall assembly 5 and the front wall assembly 9 or the rear wall assembly 91. Each lower fixing seat 7 or each tie rod fixing seat 2 is formed with three right-angled grooves respectively corresponding to one side wall assembly 5, the front wall assembly 9 or the rear wall assembly 91, and the bottom frame assembly, and the front side of each tie rod fixing seat 2 is formed with a right-angled groove corresponding to the pull rod assembly 1.

The whole assembly principle of the foldable barrow in this embodiment is as follows:

When the whole barrow is to be assembled, one side horizontal tube 28 and one front horizontal tube 32 are respectively riveted into the two right-angled grooves of each upper fixing seat 4, so that the two side wall assemblies 5, the front wall assembly 9 and the rear wall assembly 91 are connected end to end to form a rectangular frame structure. One long side tube 31 and one front tube 33 are respectively riveted into the two right-angled grooves of each of the two tie rod fixing seats 2 on one side of the rectangular frame structure to make sure that the through holes in the tie rod fixing seats 2 are coaxial with the through holes in the corresponding upper fixing seats 4. One long side tube 31 and one front tube 33 are respectively riveted into the two right-angled grooves of each of the lower fixing seats 7 on the other side of the rectangular frame structure to make sure that the through holes in the lower fixing seats 7 are coaxial with the through holes in the corresponding upper fixing seats 4. The vertical tubes 20 of the front wheel carrier assemblies 3 penetrate through the through holes in the tie rod fixing seats 2 and stretch into the through holes in the corresponding upper fixing seats 4 to be fixed, and the vertical tubes 20 of the rear wheel carrier assemblies 8 penetrate through the through holes in the lower fixing seats 2 and stretch into the through holes in the corresponding upper fixing seats 4 to be fixed. The two short bottom frame tubes 34 and the two long bottom frame tubes 35 of the bottom frame assembly 6 are respectively hinged into the oblique grooves in the tie rod fixing seats 2 and the lower fixing seats 7. The two side tie rod mounting blocks 15 of the tie rod assembly 1 are respectively hinged to the two tie rod fixing seats 2.

Figure 8:
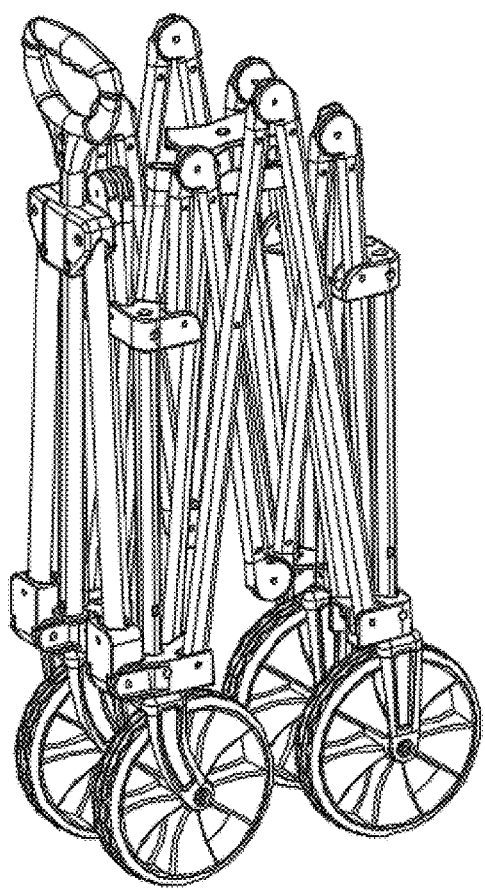
FIG. 8 is a schematic diagram of FIG. 1 in a fully folded state.
Figure 17:
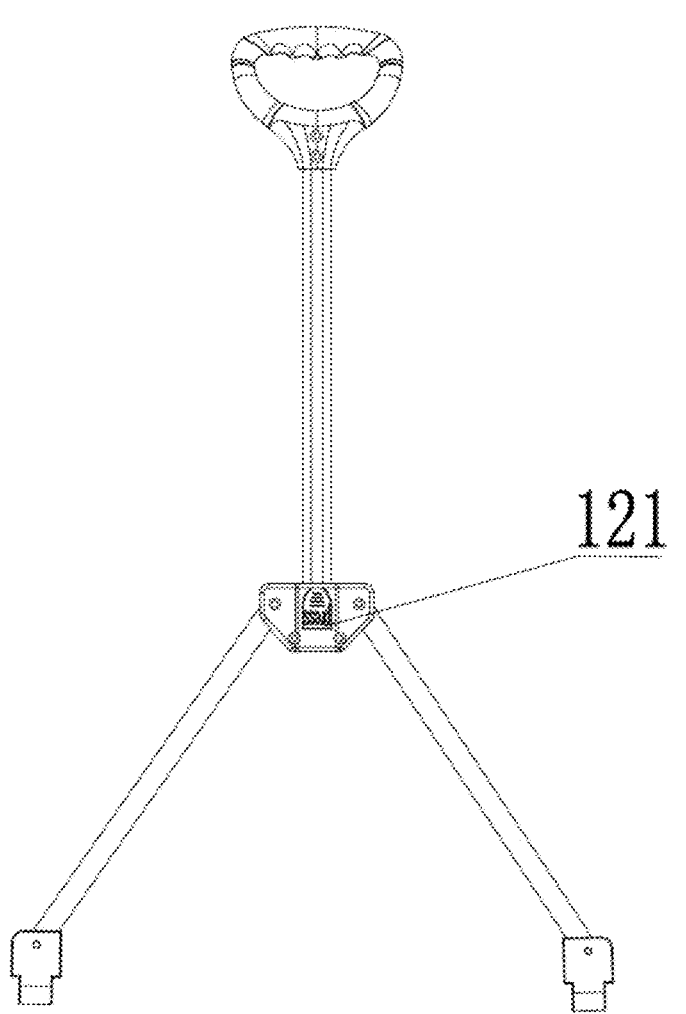
FIG. 17 is a schematic diagram of the tie rod assembly in an unfolded state.
Figure 18:
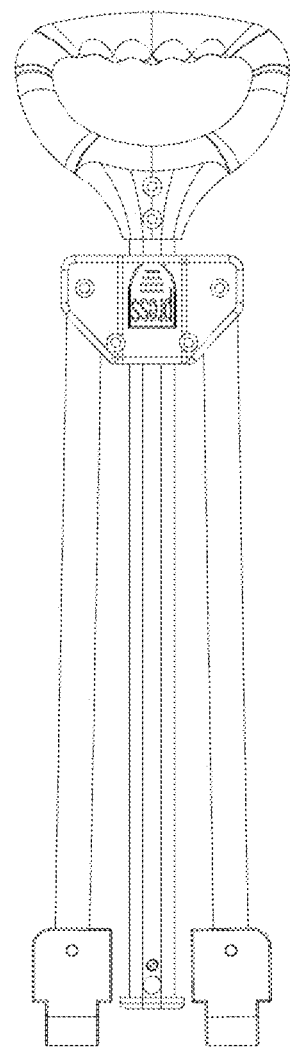
FIG. 18 is a schematic diagram of the tie rod assembly in a folded state.
Figure 28:
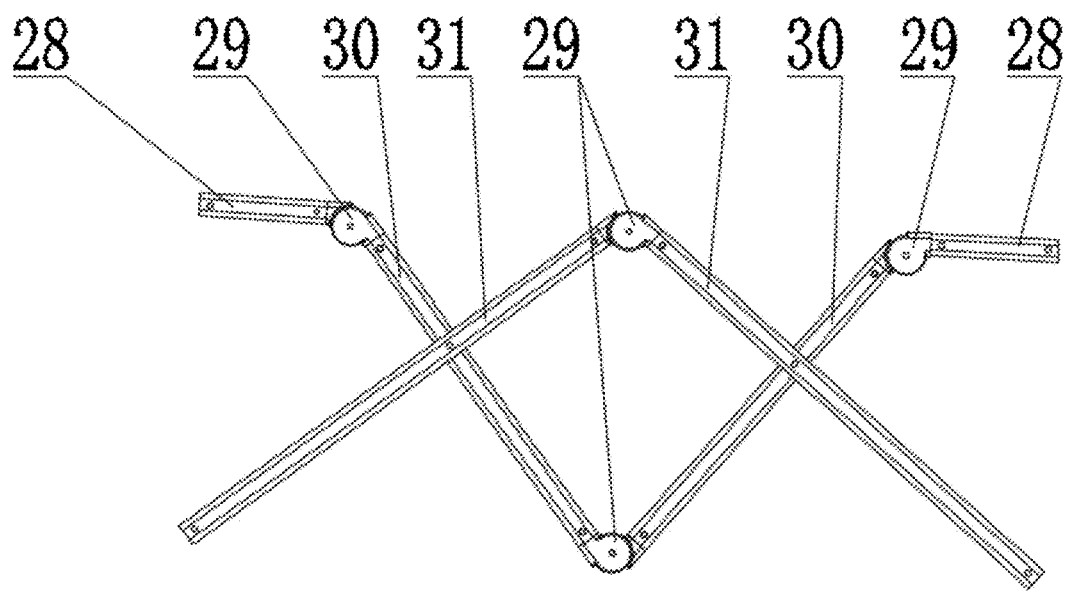
FIG. 28 is a schematic diagram of a side wall assembly in an unfolded state.
Figure 29:
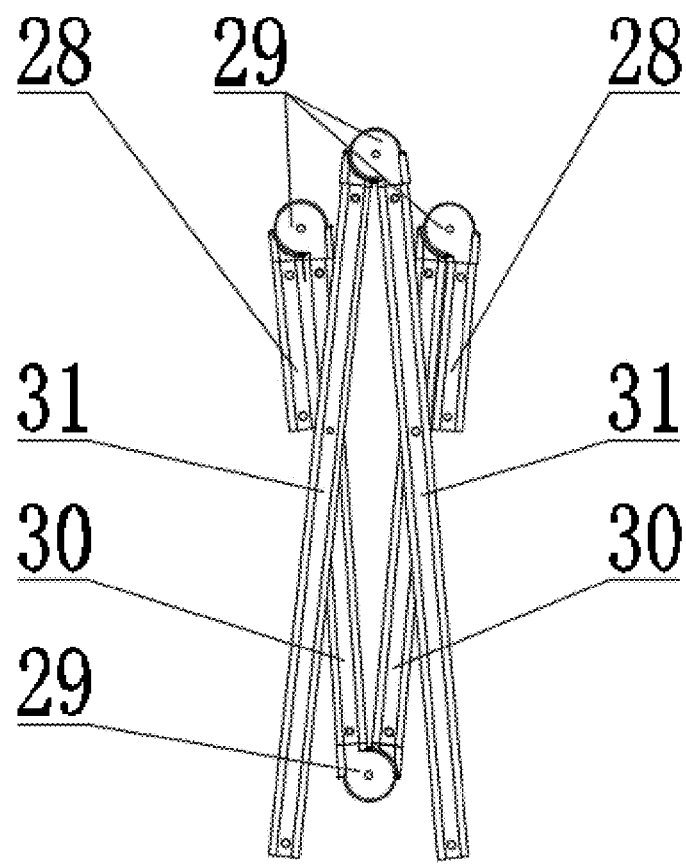
FIG. 29 is a schematic diagram of the side wall assembly in a folded state.
Figure 30:
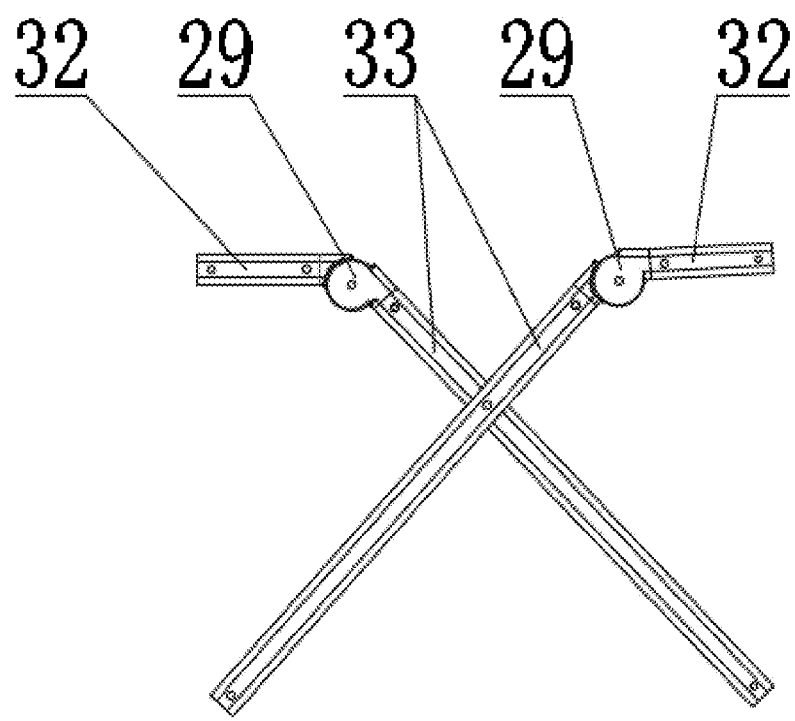
FIG. 30 is a schematic diagram of a front wall assembly or a rear wall assembly in an unfolded state.
Figure 31:
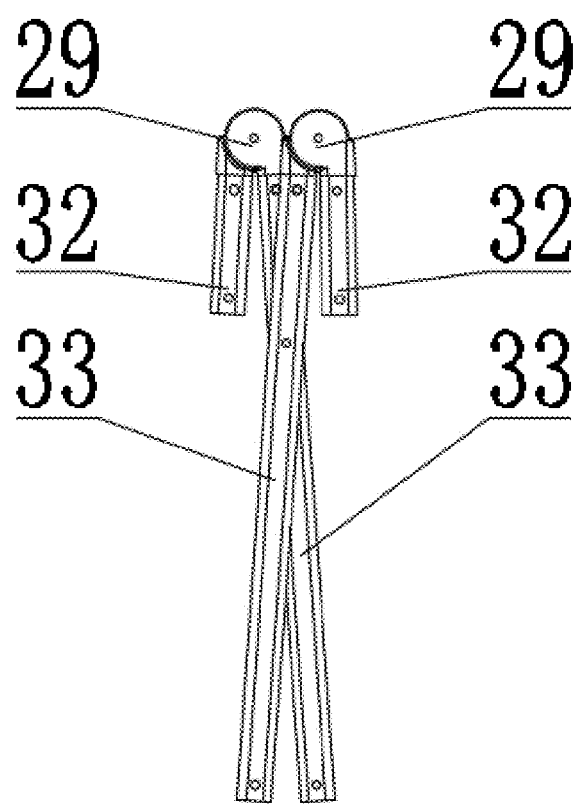
FIG. 31 is a schematic diagram of the front wall assembly or the rear wall assembly in a folded state.

The folding process and the unfolding process of the foldable barrow in this embodiment are as follows:

When the foldable barrow is to be folded, the upper connecting piece 38 is pulled upwards to drive the two short bottom frame tubes 34 to rotate around the axis of the rivet hinged to the upper connecting piece 38; and at the same time, the two long bottom frame tubes 35 and the U-shaped iron parts 36 are driven to rotate around the axis of the rivet hinged to the lower connecting piece 37 (as shown in FIG. 11). In this way, the tie rod fixing seats and the lower fixing seats 7 at the four corners are pulled to be folded towards the center, and tires and the upper fixing seats 4 connected to the tie rod fixing seats 2 and the lower fixing seats 7 are synchronously folded towards the center; the two long side tubes 31 are pushed to be folded, and the short side tubes 30 hinged to the long side tubes 31 are driven to be folded synchronously, so that the side horizontal tubes 28 hinged to the short side tubes 30 are driven to rotate upwards around the axis of the rivet connected to the corresponding upper fixing seat 4 (as shown in FIG. 29); meanwhile, the two front tubes 33 are folded to push the front horizontal tubes 32 to rotate upwards around the axis of the rivet connected to the corresponding upper fixing seats 4 (as shown in FIG. 31); and the two side tie rods 14 are driven by the tie rod fixing seats 2 to be folded. A key in the upper connecting seat 12 is pressed, and the tie rod handle 10 is pushed downwards at the same time until the tie rod handle 10 touches the upper plane of the fastener formed by the upper connecting seat 12 and the lower connecting seat 13 (as shown in FIG. 18). The whole barrow is folded until the front tires make contact with the rear tires (as shown in FIG. 8);

When the foldable barrow is to be unfolded, the upper connecting piece 38 is pressed downwards to drive the two short bottom frame tubes 34 and the two long bottom frame tubes 35 to push the two tie rod fixing seats 2 and the two lower fixing seats 7 to stretch around (as shown in FIG. 10), and the upper fixing seats 4, the front wheel carrier assemblies 3 and the rear wheel carrier assemblies 8 which are connected to the tie rod fixing seats 2 and the lower fixing seats 7 are driven to move outwards synchronously. The long side tubes 31 are pushed to stretch outwards, and the short side tubes 30 hinged to the long side tubes 31 are driven to be unfolded outwards synchronously, so that the side horizontal tubes 28 hinged to the short side tubes 30 are driven to rotate downwards around the axis of the rivet connected to the corresponding upper fixing seat 4 (as shown in FIG. 28); meanwhile, the two front side tubes 33 are stretched outwards to push the front horizontal tubes 32 to rotate downwards around the axis of the rivet connected to the corresponding upper fixing seat 4 (as shown in FIG. 30); and the two side tie rods 14 are driven by the tie rod fixing seats 2 to be unfolded outwards, and the tie rod handle 10 is pulled upwards until the middle tie rod limiting seat 16 touches the lower plane of the fastener formed by the upper connecting seat 12 and the lower connecting seat 13 (as shown in FIG. 17). The whole barrow is unfolded until the four bottom frame tubes touch the upper connecting piece 38 (as shown in FIG. 6).

Embodiment 2

Different from Embodiment 1, the front wheel carrier assemblies or the rear wheel carrier assemblies in this embodiment are of another structure. As shown in FIG. 32-FIG. 35, each front wheel carrier assembly or each rear wheel carrier assembly comprises a plastic shaft sleeve 42, a U-shaped elastic buckle 43 and a vertical support tube 44, wherein the plastic shaft sleeve 42 is sequentially provided with a through hole, a limiting protrusion and a trapezoidal protrusion from top to bottom, a circular shaft of a tire holder 41 is sleeved with the plastic shaft sleeve 42, the limiting protrusion protrudes towards the circular shaft to be clamped in a groove in the upper portion of the circular shaft, the U-shaped elastic buckle 43 comprises a U-shaped leaf spring and a cylindrical head arranged close to an opening of the U-shaped leaf spring and is inversely mounted in the plastic shaft sleeve 42, the cylindrical head is clamped in the through hole in the plastic shaft sleeve 42, a trapezoidal notch is formed in an outer circle of the bottom end of the vertical support tube 44, the vertical support tube 44 is formed with a through hole located above the trapezoidal notch and is disposed around the U-shaped elastic buckle 43 and the plastic shaft sleeve 42, the cylindrical head is clamped in the through hole in the vertical support tube, and the trapezoidal notch in the vertical support tube 44 is clamped on the trapezoidal protrusion on the plastic shaft sleeve 42. A tire is mounted at the lower end of the tire holder 41. The connecting manner of the upper end of the vertical support tube 44 and the frame assembly in this embodiment is the same as the assembling manner of the vertical tube 20 and the frame assembly in Embodiment 1.

Furthermore, the plastic shaft sleeve 42 is provided with two limiting protrusions which are arranged in the middle of the plastic shaft sleeve 2 in a bilaterally symmetrical manner, and the limiting protrusions are separated on three sides and connected at the bottom, are perpendicular to the axis direction of the plastic shaft sleeve 42, and protrude towards the interior of the plastic shaft sleeve 42.

Figure 32:
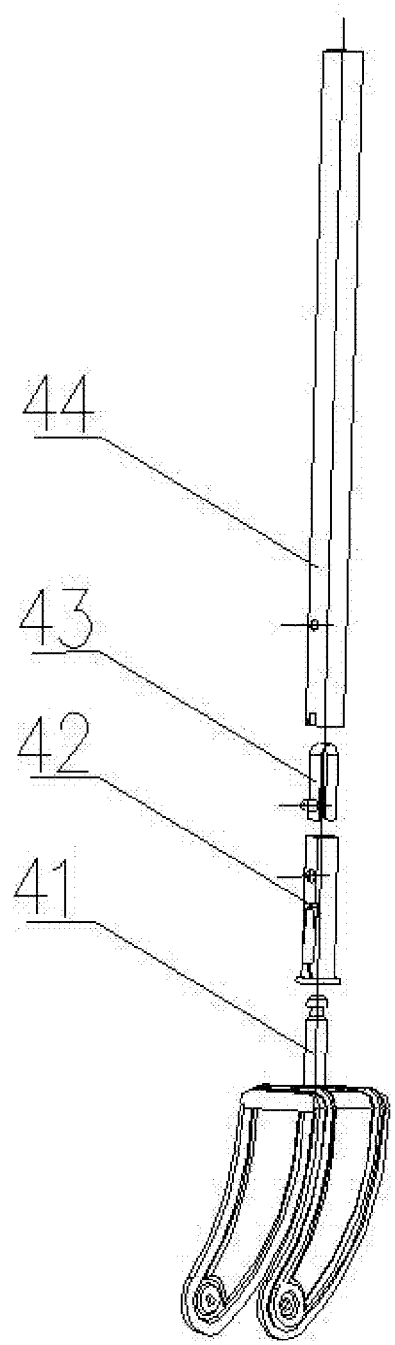
FIG. 32 is an exploded view of the front wheel carrier assembly or the rear wheel carrier assembly of another structure.

As shown in FIG. 32, each front wheel carrier assembly or each rear wheel carrier assembly is mainly composed of a tire holder 41, a plastic shaft sleeve 42, a U-shaped elastic buckle 43 and a vertical support tube 44, wherein a through hole in the plastic shaft sleeve 42 and a through hole in the vertical support tube 44 are both circular holes; a vertical circular shaft is welded to the center of the upper portion of the tire holder 41 and has an upper end formed with a circular groove; the plastic shaft sleeve 42 is in the shape of a hollow cylinder, and a trapezoidal protrusion is arranged on an outer circular surface of the bottom end of the plastic shaft sleeve 42; two limiting protrusions which are separated on three sides and connected at the bottom and protrude towards the interior of the plastic shaft sleeve 42 are symmetrically arranged in the middle of the plastic shaft sleeve 42 in a direction perpendicular to the axis direction of the cylinder; a circular hole is formed in the upper portion of the plastic shaft sleeve 42; a solid cylindrical head is riveted to the upper end of an opening of a U-shaped leaf spring of the U-shaped elastic buckle 43; and the vertical support tube 44 is a circular tube, a trapezoidal notch is formed in an outer circle of the bottom end of the vertical support tube 44, and a circular hole is formed above the notch.

Figure 33:
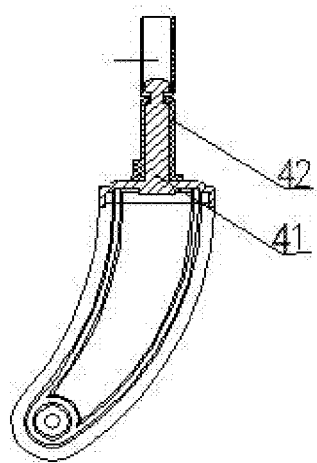
FIG. 33 is a matching diagram of a plastic shaft sleeve and a tire holder in FIG. 32.
Figure 34:
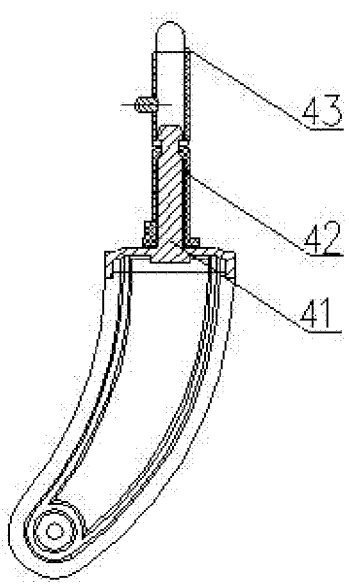
FIG. 34 is a matching diagram of a U-shaped elastic buckle and the plastic shaft sleeve in FIG. 32.
Figure 35:
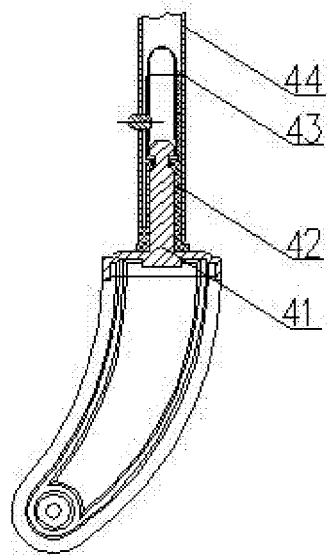
FIG. 35 is a matching diagram of a vertical support tube, the plastic shaft sleeve and the U-shaped elastic buckle in FIG. 32.

When each front wheel carrier assembly or each rear wheel carrier assembly is to be assembled, the circular shaft on the tire holder 41 is inserted into the plastic shaft sleeve 42 to make sure that the limiting protrusion in the middle of the plastic shaft sleeve 42 is clamped in the groove in the upper end of the circular shaft on the tire holder 1, as shown in FIG. 33, so that the tire holder 41 is able to rotate around the circular shaft and is unable to move upwards or downwards along the axis. Then, the opening of the U-shaped elastic buckle 43 is downwards inserted into the upper portion of the plastic shaft sleeve 42, as shown in FIG. 34, to make sure that the solid cylindrical head of the U-shaped elastic buckle 43 stretches into the circular hole in the upper portion of the plastic shaft sleeve 42. Afterwards, the plastic shaft sleeve 42 having the tire holder 41 and the U-shaped elastic buckle 43 assembled thereon is inserted into the vertical support tube 44 to make sure that the trapezoidal notch in the bottom end of the vertical support tube 44 is clamped on the trapezoidal protrusion at the bottom end of the plastic shaft sleeve 42 and that the solid cylindrical head, stretching into the hole in the plastic shaft sleeve 42, of the U-shaped elastic buckle 43 penetrates through the circular hole in the vertical support tube 44, so that the plastic shaft sleeve 42 is fixed in the vertical support tube 44 and is unable to move, and only the tire holder 41 is able to rotate.

When each front wheel carrier assembly or each rear wheel carrier assembly is to be disassembled, the solid cylindrical head, exposed out of the vertical support tube 44, of the U-shaped elastic buckle 43 is pressed into the vertical support tube 44, and then the tire holder 41 together with the plastic shaft sleeve 42 and the U-shaped elastic buckle 3 can be downwards pulled out to realize rapid disassembly.

The above implementations are preferred ones of the invention, and are not intended to limit the protection scope of the invention. All transformations and improvements made by those skilled in the art according to the design concept of the invention should fall within the protection scope of the invention. More particularly, various transformations and improvements of components of combined layout and/or layout of the subject matter can be made within the scope of the disclosure, drawings and claims of this application. In addition to the transformations and improvements of the components and/or layout, it is obvious for those skilled in the art to appreciate other purposes.

What is claimed is:

1. A foldable barrow, comprising a frame assembly, wherein the frame assembly comprises a tie rod assembly, two front wheel carrier assemblies, two rear wheel carrier assemblies, two side wall assemblies, a front wall assembly, a rear wall assembly, a bottom frame assembly, four upper fixing seats, two tie rod fixing seats, and two lower fixing seats, wherein:

each said side wall assembly comprises two side horizontal tubes and at least one first X-shaped link mechanism, wherein each of upper ends of two sides of the first X-shaped link mechanism is hinged to an end of one said side horizontal tube, an end of each said side horizontal tube is riveted to one said upper fixing seat, and lower ends of the two sides of the first X-shaped link mechanism are respectively riveted to one said tie rod fixing seat and one said lower fixing seat;

the front wall assembly comprises a second X-shaped link mechanism and two front horizontal tubes, wherein each of upper ends of two sides of the second X-shaped link mechanism is hinged to one said front horizontal tube; and the rear wall assembly is identical in structure with the front wall assembly;

the two side wall assemblies, the front wall assembly and the rear wall assembly are connected end to end to form a rectangular frame structure;

the bottom frame assembly is arranged at a bottom of the rectangular frame structure and comprises a third X-shaped link mechanism, and four ends of the third X-shaped link mechanism are respectively riveted to the two tie rod fixing seats and the two lower fixing seats;

the tie rod assembly comprises a tie rod handle, a middle tie rod and two side tie rods, wherein the tie rod handle is mounted at an upper end of the middle tie rod, upper ends of the two side tie rods are symmetrically arranged on two sides of the middle tie rod and are riveted to the middle tie rod, and lower ends of two side tie rods are respectively riveted to front ends of the two tie rod fixing seats;

each said front wheel carrier assembly comprises a vertical tube, a tire holder and a tire, wherein the vertical tube, the tire holder and the tire are sequentially mounted from top to bottom, and the vertical tube penetrates through a through hole in one said tie rod fixing seat and a through hole in one said upper fixing seat to be fixed; the rear wheel carrier assemblies are identical in structure with the front wheel carrier assemblies; and vertical tube of each said rear wheel carrier assembly penetrates through a through hole in one said lower fixing seat and a through hole in another said upper fixing seat to be fixed.

2. The foldable barrow according to claim 1, wherein the first X-shaped link mechanism comprises at least one X-shaped structure formed by crossed riveting of a long side tube and a short side tube; or, the second X-shaped link mechanism is formed by crossed riveting of two front tubes.

3. The foldable barrow according to claim 1, wherein the third X-shaped link mechanism is foldable and comprises two short bottom frame tubes, two long bottom frame tubes and a bottom frame connecting seat, a limiting board is arranged on an upper surface of the bottom frame connecting seat, and the two short bottom frame tubes and the two long bottom frame tubes are arranged below the limiting board in a crossed manner and are rotatably connected to the bottom frame connecting seat.

4. The foldable barrow according to claim 3, wherein the bottom frame connecting seat comprises an upper connecting piece and a lower connecting piece, the upper connecting piece is detachably connected to the lower connecting piece, and an upper surface of the upper connecting piece is the limiting board; and the two short bottom frame tubes are respectively riveted into grooves in two ends of the upper connecting piece, and the two long bottom frame tubes are respectively riveted to two ends of the lower connecting piece.

5. The foldable barrow according to claim 4, wherein the bottom frame connecting seat further comprises two U-shaped parts, two protruding parts are respectively and symmetrically arranged at the two ends of the lower connecting piece, an end of each said bottom frame tube penetrates through a middle of one said U-shaped part and is fixed by welding, and two ends of an open side of each said U-shaped part are riveted to one said protruding part.

6. The foldable barrow according to claim 1, wherein the tie rod assembly further comprises a tie rod connecting seat, a middle tie rod limiting seat, a stepped ball head and a spring, a lower end of the middle tie rod stretches into a vertical through hole in the tie rod connecting seat and is able to slide upwards and downwards, the two side tie rods are symmetrically arranged on two sides of the tie rod connecting seat and are riveted to the tie rod connecting seat, and the stepped ball head and the spring are arrange at an upper end of an interior of the middle tie rod limiting seat;

an upper end of the middle tie rod limiting seat stretches into the middle tie rod and is riveted to the lower end of the middle tie rod through a rivet, and a side wall of the lower end of the middle tie rod is formed with a hole allowing the stepped ball head to stretch or retreat; the upper end of the middle tie rod limiting seat is formed with a mounting through hole radially penetrating through the middle tie rod limiting seat, the stepped ball head has an end abutting against an end of the spring and an end penetrating through a side of the mounting through hole to stretch out of the hole, and an end of the spring penetrates through a side of the mounting through hole to abut against an inner wall of the middle tie rod;

a key protrusion capable of being pressed inwards is arranged on a side of the tie rod connecting seat, and a slope which gradually inclines towards an axis from bottom to top is arranged on an inner wall of the vertical through hole below the key protrusion;

the middle tie rod slides upwards in the vertical through hole to drive the middle tie rod limiting seat to move upwards, and the stepped ball head moves upwards along the slope to abut against an inner wall of the key protrusion.

7. The foldable barrow according to claim 6, wherein the tie rod connecting seat comprises an upper connecting seat and a lower connecting seat, the upper connecting seat and the lower connecting seat are connected through a rivet to form a fastener, and the middle tie rod penetrates through a vertical through hole in a center of the fastener and is able to slide upwards and downwards; and the key protrusion is formed at an upper end of a side face of the upper connecting seat, and the slope is arranged on the inner wall of the vertical through hole in a lower end of the upper connecting seat.

8. The foldable barrow according to claim 6, wherein the tie rod assembly further comprises two side tie rod mounting blocks, each of the two side tie rod mounting blocks is riveted to a lower end of one said side tie rod and is riveted to the front end of one said tie rod fixing seat; or, a flange is arranged on a lower surface of the middle tie rod limiting seat.

9. The foldable barrow according to claim 7, wherein the tie rod assembly further comprises two side tie rod mounting blocks, each of the two side tie rod mounting blocks is riveted to a lower end of one said side tie rod and is riveted to the front end of one said tie rod fixing seat; or, a flange is arranged on a lower surface of the middle tie rod limiting seat.

10. The foldable barrow according to claim 1, wherein each said front wheel carrier assembly or each said rear wheel carrier assembly comprises a lock, a lock spring and a shaft sleeve, the vertical tube, the shaft sleeve and the tire holder are sequentially arranged from top to bottom in a sleeving manner, and the lock and the lock spring are arranged in the shaft sleeve; and a wall of a lower end of the vertical tube is formed with a mounting through hole, and an upper end of the shaft sleeve is formed with a radial through hole;
the lock spring and a hook are respectively arranged on an upper portion and a lower portion of a rear end of the lock, a protruding part is arranged at a front end of the lock, a limiting clamp groove is formed in a cylinder at an upper end of the tire holder, the protruding part penetrates through an end of the through hole to stretch out of the mounting through hole, the lock spring stretches out of an end of the through hole to abut against an inner wall of the vertical tube, and the hook is clamped in the limiting clamp groove.

11. The foldable barrow according to claim 10, wherein a spring mounting hole is formed in the upper portion of the rear end of the lock, and a front end of the lock spring abuts against a bottom of the spring mounting hole;
or, the limiting clamp groove is an annular groove;
or, symmetrical sliding grooves are formed in two side faces of a lock body and are matched with sliding rails on two sides of an inner wall of the through hole.

12. The foldable barrow according to claim 1, wherein each said front wheel carrier assembly or each said rear wheel carrier assembly further comprises a plastic shaft sleeve and a U-shaped elastic buckle, the plastic shaft sleeve is sequentially provided with a through hole, a limiting protrusion and a trapezoidal protrusion from top to bottom, a circular shaft on the tire holder is sleeved with the plastic shaft sleeve, the limiting protrusion protrudes towards the circular shaft to be clamped in a groove in an upper portion of the circular shaft, the U-shaped elastic buckle comprises a U-shaped leaf spring and a cylindrical head arranged close to an opening of the U-shaped leaf spring and is reversely mounted in the plastic shaft sleeve, the cylindrical head is clamped in the through hole in the plastic shaft sleeve, a trapezoidal notch is formed in an outer circle of a bottom end of the vertical tube, the vertical tube is formed with a through hole located above the trapezoidal notch, the vertical tube is disposed around the U-shaped elastic buckle and the plastic shaft sleeve, the cylindrical head is clamped in the through hole in the vertical tube, and the trapezoidal notch in the vertical tube is clamped on the trapezoidal protrusion of the plastic shaft sleeve.

13. The foldable barrow according to claim 12, wherein the plastic shaft sleeve is provided with two said limiting protrusions which are arranged in a middle of the plastic shaft sleeve in a bilaterally symmetrical manner, and the limiting protrusions are separated on three sides and connected at a bottom, are perpendicular to an axis direction of the plastic shaft sleeve, and protrude towards an interior of the plastic shaft sleeve.

* * * * *